(12) United States Patent
Nakamura et al.

(10) Patent No.: US 11,272,600 B2
(45) Date of Patent: Mar. 8, 2022

(54) INFORMATION PROCESSING APPARATUS AND INFORMATION PROCESSING METHOD

(71) Applicant: SONY CORPORATION, Tokyo (JP)

(72) Inventors: Takatoshi Nakamura, Tokyo (JP); Takashi Ishizaka, Tokyo (JP); Kuniaki Kurihara, Tokyo (JP); Tomomichi Kataoka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 303 days.

(21) Appl. No.: 16/349,144

(22) PCT Filed: Nov. 30, 2017

(86) PCT No.: PCT/JP2017/043019
§ 371 (c)(1),
(2) Date: May 10, 2019

(87) PCT Pub. No.: WO2018/101394
PCT Pub. Date: Jun. 7, 2018

(65) Prior Publication Data
US 2019/0287270 A1    Sep. 19, 2019

Related U.S. Application Data

(60) Provisional application No. 62/428,766, filed on Dec. 1, 2016.

(51) Int. Cl.
*G06T 7/90* (2017.01)
*H05B 47/10* (2020.01)
(Continued)

(52) U.S. Cl.
CPC .............. *H05B 47/10* (2020.01); *A01K 63/06* (2013.01); *F21S 2/00* (2013.01); *G06T 7/90* (2017.01); *H04N 5/74* (2013.01); *H05B 47/115* (2020.01)

(58) Field of Classification Search
None
See application file for complete search history.

(56) References Cited

U.S. PATENT DOCUMENTS 6,611,297 B1   8/2003  Akashi et al.
9,907,137 B1 * 2/2018  Lebens ................... F21L 4/027
(Continued)

FOREIGN PATENT DOCUMENTS

JP       49-077469 A    7/1974
JP       49-77469 A     7/1974
(Continued)

OTHER PUBLICATIONS

International Search Report and Written Opinion of PCT Application No. PCT/JP2017/043019, dated Mar. 6, 2018, 10 pages of ISRWO.

*Primary Examiner* — Anh Q Tran
(74) *Attorney, Agent, or Firm* — Chip Law Group

(57) ABSTRACT

To provide an information processing apparatus and an information processing method. Provided is an information processing apparatus that includes a recognition section and an output control section. The recognition section recognizes background content displayed in a background of an aquarium. The output control section controls an output of light into an interior of the aquarium that acts as a foreground, on the basis of a result of recognizing the background content.

18 Claims, 25 Drawing Sheets

(51) Int. Cl.
*A01K 63/06* (2006.01)
*H04N 5/74* (2006.01)
*F21S 2/00* (2016.01)
*H05B 47/115* (2020.01)

(56) References Cited

U.S. PATENT DOCUMENTS

| | | |
|---|---|---|
| 2012/0098960 A1 | 4/2012 | Fujino et al. |
| 2015/0156995 A9 * | 6/2015 | Tang ........................ A01K 1/03 |
| | | 119/267 |
| 2018/0192621 A1 * | 7/2018 | Valatka ................ A01K 63/045 |

FOREIGN PATENT DOCUMENTS

| | | | |
|---|---|---|---|
| JP | 4977469 A * | 7/1974 | |
| JP | 08-298005 A | 11/1996 | |
| JP | 2000-173783 A | 6/2000 | |
| JP | 2000173783 A * | 6/2000 | |
| JP | 2005-229835 A | 9/2005 | |
| JP | 2008-268694 A | 11/2008 | |
| JP | 2009-064594 A | 3/2009 | |
| JP | 2009064594 A * | 3/2009 | |
| JP | 2015-133220 A | 7/2015 | |
| JP | 2015133220 A * | 7/2015 | |
| WO | 99/53728 A1 | 10/1999 | |
| WO | 2009/028168 A1 | 3/2009 | |
| WO | WO-2009028168 A1 * | 3/2009 | ............. H05B 47/10 |

* cited by examiner

FIG. 1
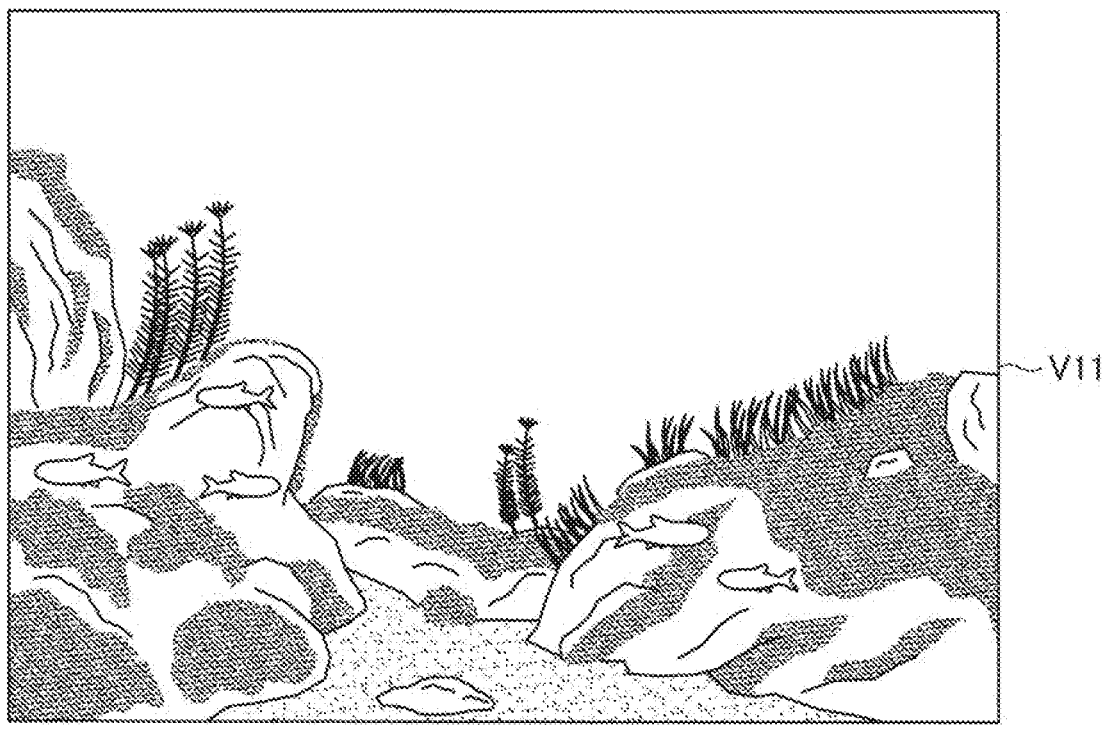
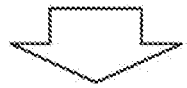
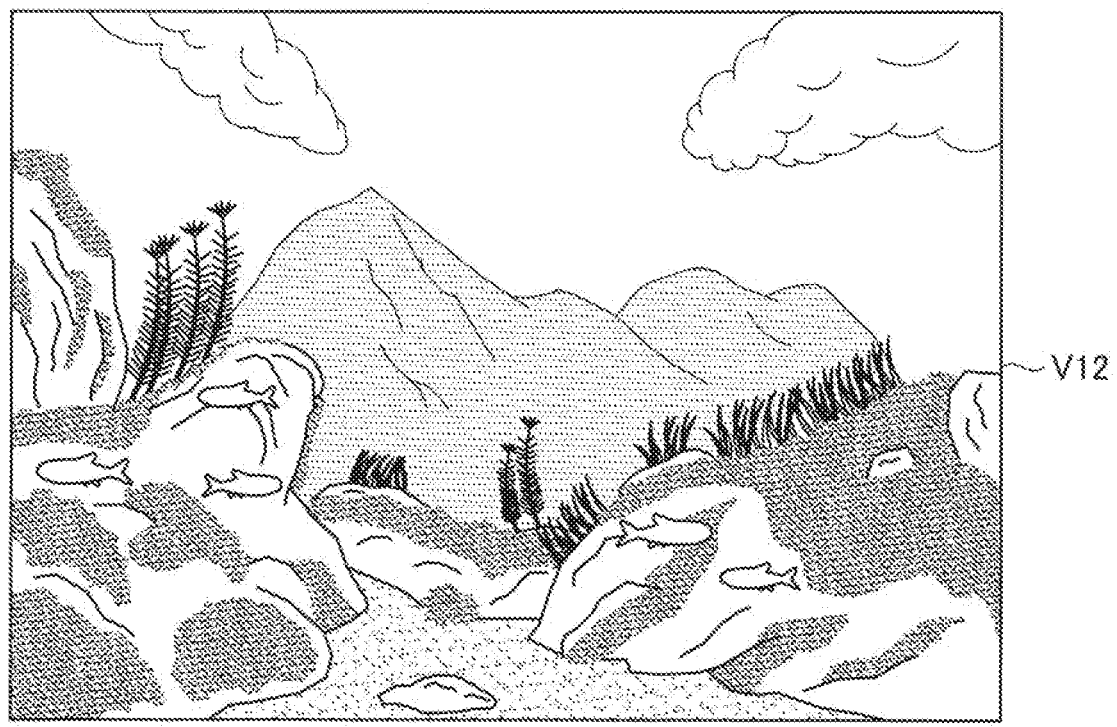

FIG. 12
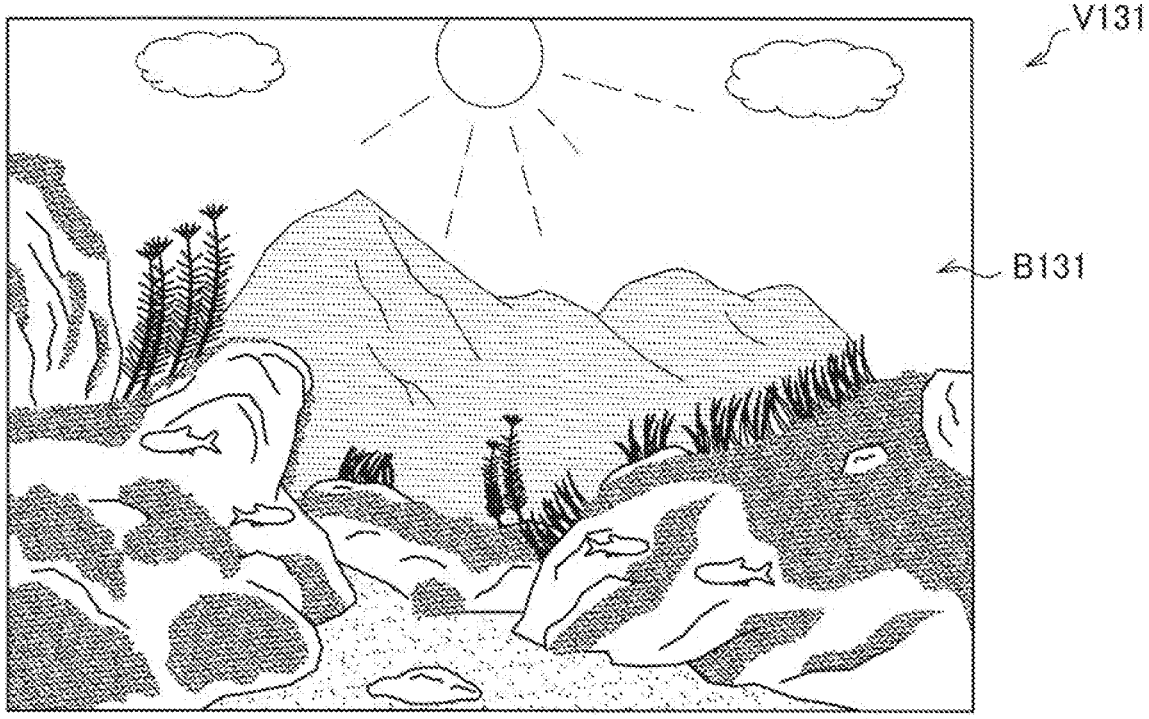
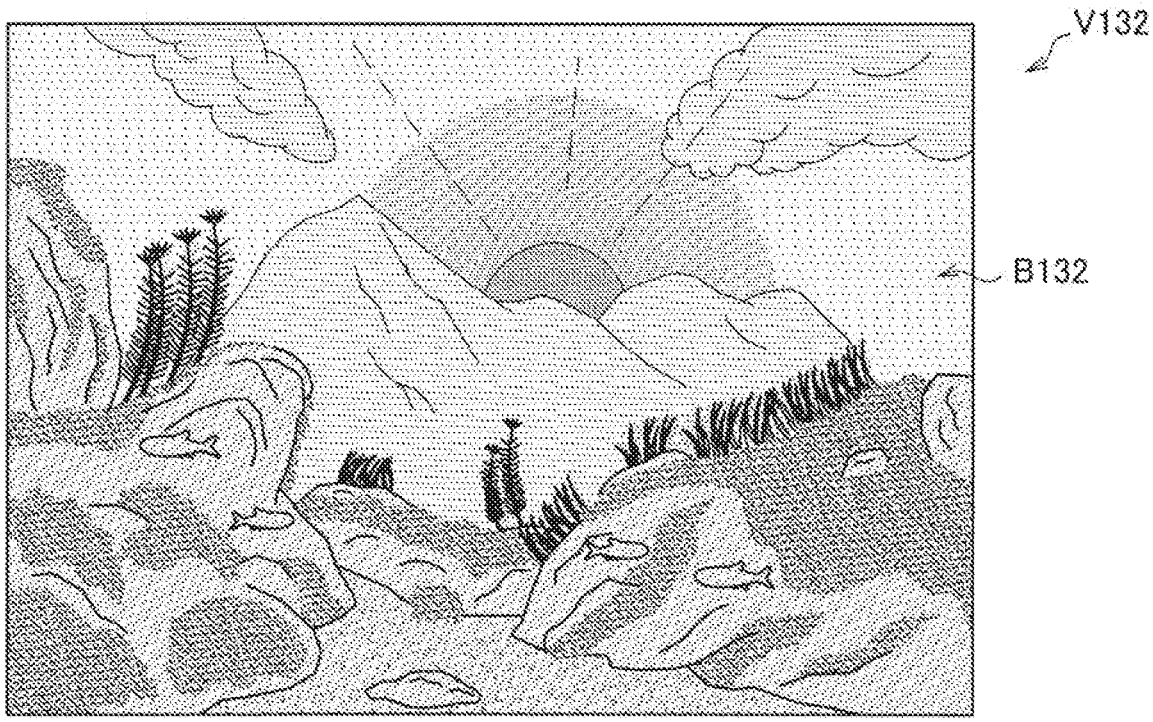

FIG. 13
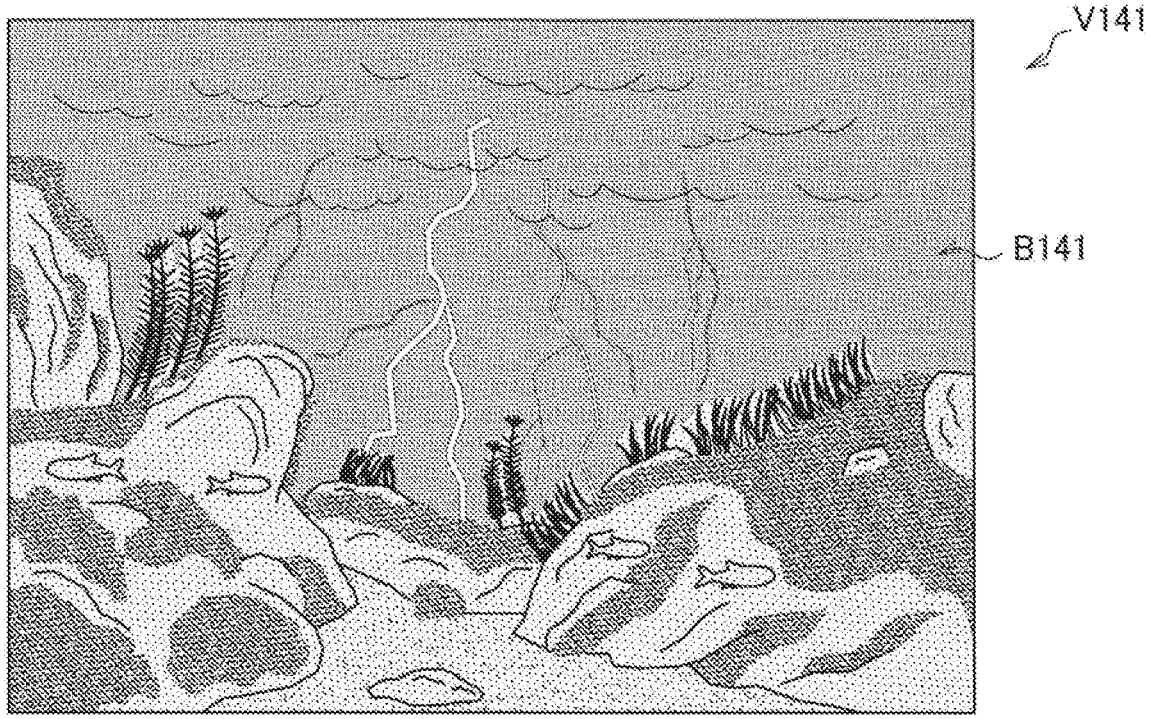
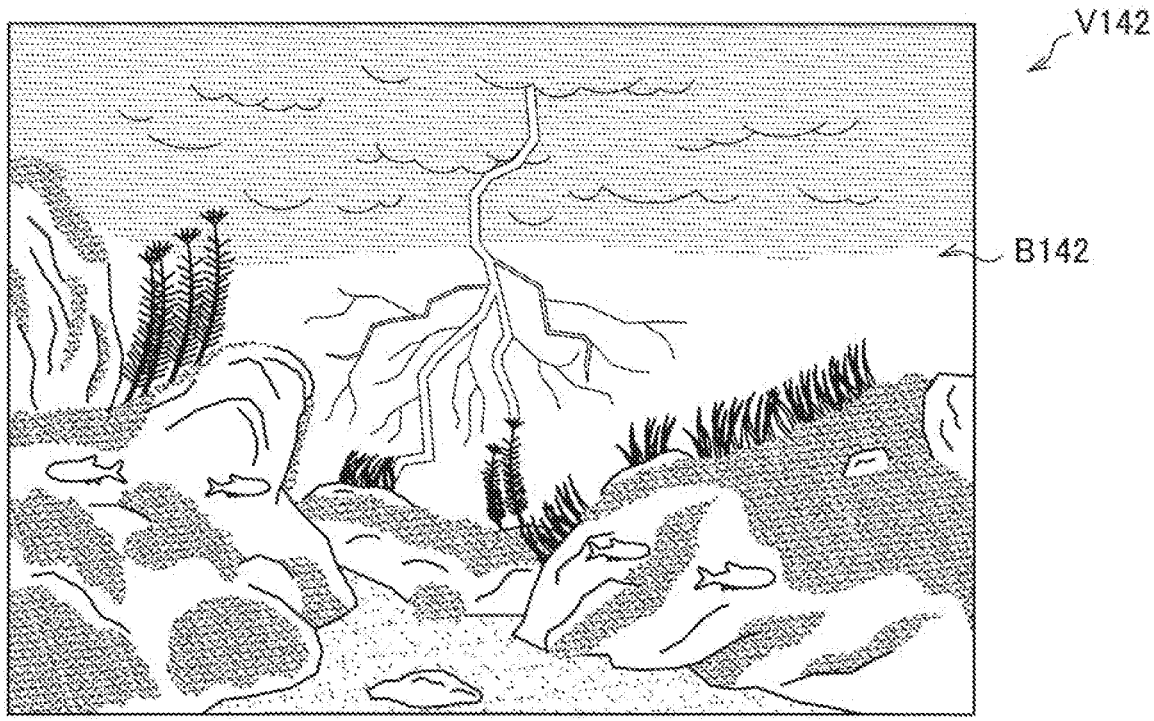

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/043019 filed on Nov. 30, 2017, which claims priority benefit of U.S. Provisional Application No. 62/428,766 filed in the US Patent Office on Dec. 1, 2016. Each of the above-referenced applications is hereby incorporated herein by reference in its entirety.

TECHNICAL FIELD

The present disclosure relates to an information processing apparatus, an information processing method, and a program.

BACKGROUND ART

In the case of raising ornamental fish in an aquarium, illumination equipment that outputs (radiates) light inside the aquarium is used. In addition, technology for controlling the illumination equipment is also being developed. For example, Patent Literature 1 below discloses an in-aquarium illumination apparatus capable of controlling the movement and turning-on of lighting apparatus by operating a control unit. Also, Patent Literature 2 below discloses technology that automatically executes schedule control of illumination from the time or the indoor brightness.

CITATION LIST

Patent Literature

Patent Literature 1: JP H8-298005A
Patent Literature 2: JP 2005-229835A

DISCLOSURE OF INVENTION

Technical Problem

However, the technology described above is for controlling the illumination to inspect the inside of the aquarium, suppress the growth of algae and sphagnum moss inside the aquarium, or reduce the stress of the ornamental fish. Consequently, there is room for further improvement to provide a user with a more beautiful scene.

Accordingly, the present disclosure proposes a novel and improved information processing apparatus, information processing method, and program capable of providing a user with a more beautiful scene.

Solution to Problem

According to the present disclosure, there is provided an information processing apparatus including: a recognition section configured to recognize background content displayed in a background of an aquarium; and an output control section configured to control an output of light into an interior of the aquarium that acts as a foreground, on the basis of a result of recognizing the background content.

Moreover, according to the present disclosure, there is provided an information processing method including: recognizing background content displayed in a background of an aquarium; and controlling an output of light into an interior of the aquarium that acts as a foreground, on the basis of a result of recognizing the background content.

Moreover, according to the present disclosure, there is provided a program causing a computer to execute functions of: recognizing background content displayed in a background of an aquarium; and controlling an output of light into an interior of the aquarium that acts as a foreground, on the basis of a result of recognizing the background content.

Advantageous Effects of Invention

According to the present disclosure as described above, it is possible to provide a user with a more beautiful scene.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram for explaining an overview of one embodiment of the present disclosure.

FIG. 12 is a diagram illustrating a third specific example of output control according to the embodiment.

FIG. 13 is a diagram illustrating a fourth specific example of output control according to the embodiment.

MODE(S) FOR CARRYING OUT THE INVENTION

Figure 2:
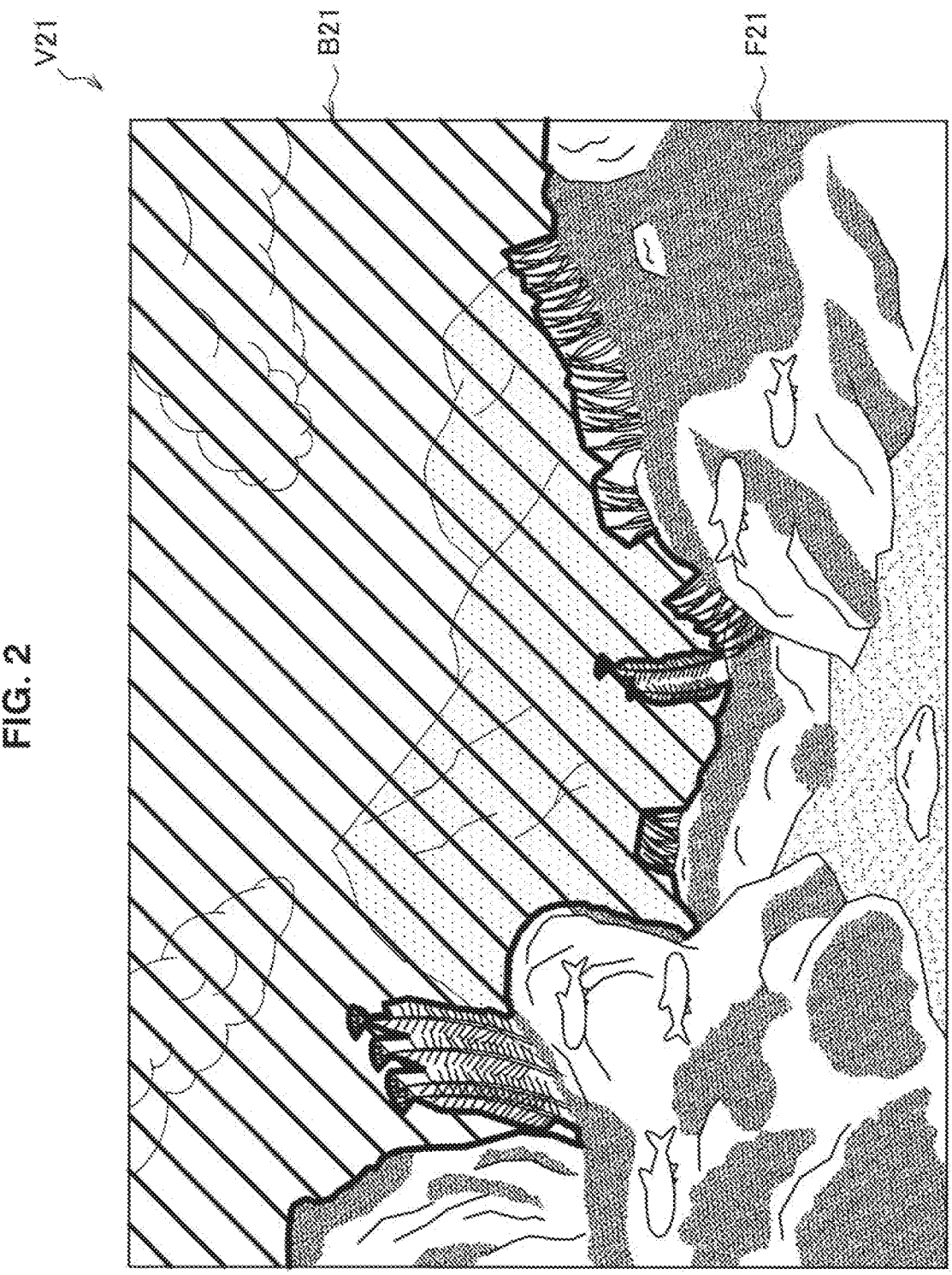
FIG. 2 is an explanatory diagram for explaining an overview of the embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

<<1. Overview>>
<<2. Configuration>>
<<3. Operations>>
<<4. Specific Examples>>
<<5. Modifications>>
<<6. Hardware Configuration Example>>
<<7. Advantageous Effects>>

1. OVERVIEW

Figure 3:
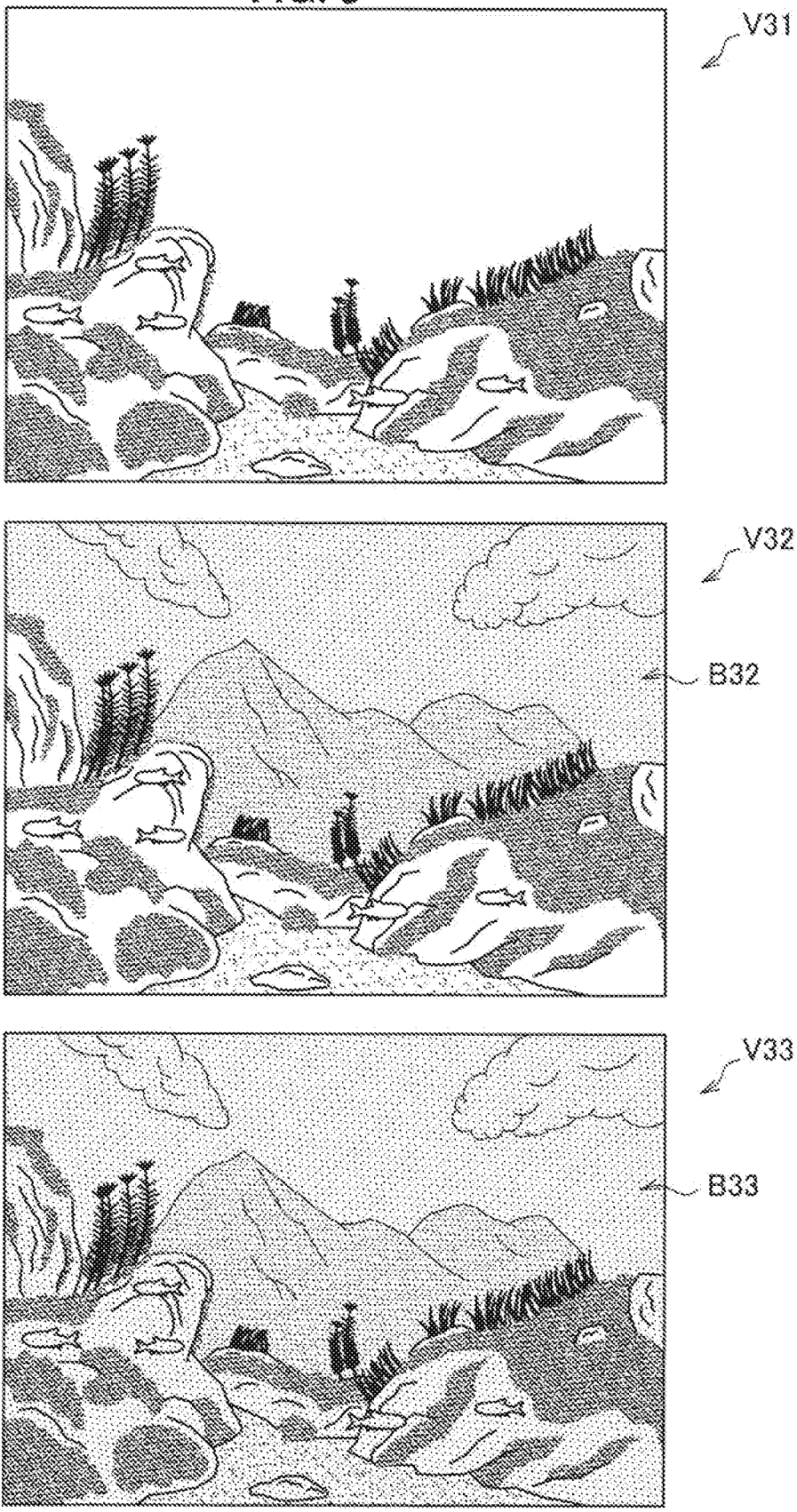
FIG. 3 is an explanatory diagram for explaining an overview of the embodiment.

First, an overview of one embodiment of the present disclosure will be described with reference to FIGS. 1 to 3. FIGS. 1 to 3 are diagrams for explaining an overview of one embodiment of the present disclosure.

FIG. 1 illustrates a field of view V11 of a user who views an aquarium. Inside the aquarium, besides including living things such as ornamental fish and water plants, non-living things such as sand, decorative stones, an artificial additions are placed. In the present embodiment, by displaying an image in the background of such an aquarium, a field of view V12 including a more beautiful scene is provided to a user. Note that in this specification, the term image may be used as an expression denoting both still images and moving images (video). Also, in the following, an image displayed in the background of an aquarium will be called background content. The background content may be any of various images, such as mountains, the sea, the sky, or space, for example, and by displaying a variety of background content, it is possible to provide a user with a variety of scenes.

The foreground F21 in the front illustrated in FIG. 2 includes the living things and the non-living things inside the aquarium. Also, in FIG. 2, the background content B21 displayed in the background behind the foreground F21 is indicated with diagonal lines. In the field of view V21 of the user, the foreground F21 which is real and the background content B21 which is an image are combined and visually perceived.

At this point, if the background content B21 is simply displayed in the background of the foreground F21, in some cases it is difficult to present the background content B21 and the foreground F21 as a scene that feels like a cohesive whole.

In the field of view V31 illustrated in FIG. 3, nothing is being displayed in the background, and the interior of the aquarium is brightly illuminated by an illumination apparatus. In this state, in the case in which a relatively dark background content B32 is displayed in the background like the field of view V32 illustrated in FIG. 3 for example, the brightness differs between the background and the foreground, and there is a risk of being unable to present the background and foreground as a scene that feels like a cohesive whole.

In the case in which the background content is a static still image, the user may be able to adjust the illumination apparatus, but in the case in which the background content is a moving image or in the case in which the still image is changed, it is difficult to continue to provide a scene that feels like a cohesive whole.

Accordingly, in the present embodiment, like in the field of view V33 illustrated in FIG. 3, the output of light by the illumination apparatus is controlled such that the interior of the aquarium reaches a brightness corresponding to the background content B33. According to such a configuration, it becomes possible to show the background content and the interior of the aquarium that acts as the foreground to the user as a scene that feels like a cohesive whole.

Note that in FIG. 3, an example of controlling the light output according to the brightness of the background content is described, but according to the present embodiment, it is also possible to control the light output according to various other conditions, such as the hue and contrast. Additionally, according to the present embodiment, it is also possible to select appropriate background content according to the conditions in the interior of the aquarium. Hereinafter, a configuration and operations of one embodiment of the present disclosure capable of exhibiting such advantageous effects will be described successively in detail.

2. CONFIGURATION

Figure 4:
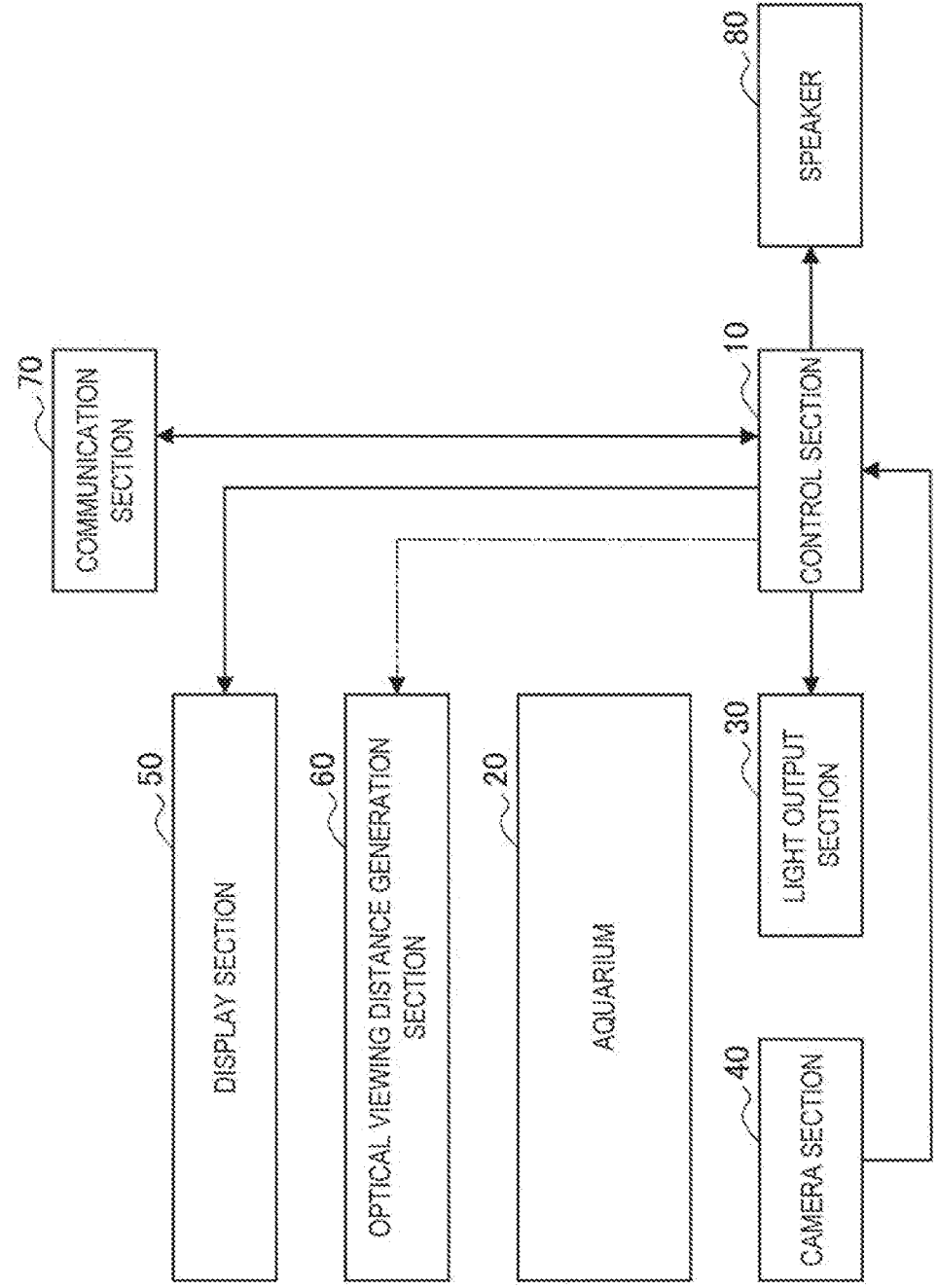
FIG. 4 is a block diagram illustrating an exemplary functional configuration of an aquarium system 1 according to the embodiment.

The above describes an overview of one embodiment of the present disclosure. Next, an exemplary configuration of the present embodiment will be described. FIG. 4 is a block diagram illustrating an exemplary functional configuration of an aquarium system 1 according to the present embodiment. As illustrated in FIG. 4, the aquarium system 1 according to the present embodiment includes a control section 10, an aquarium 20, a light output section 30, a camera section 40 (photographic recognition section), a display section 50 (background display section), an optical viewing distance generation section 60, a communication section 70, and a speaker 80.

The control section 10 is an information processing apparatus that controls the aquarium system 1 as a whole. For example, the control section 10 controls the output of light to the aquarium interior by the light output section 30 on the basis of background content displayed in the background of the aquarium 20. In addition, the control section 10 may also cause the display section 50 to display (output) the background content. In addition, the control section 10 may also control the output of sound by the speaker 80 according to the background content. Note that a more detailed configuration of the control section 10 will be described later with reference to FIG. 8.

The aquarium 20 is formed in a box shape for example from a material such as glass or plastic that transmits light, such that both the interior of the aquarium 20 and the background are visible. The interior of the aquarium 20 is filled with water up to a desired water level, and besides including living things such as ornamental fish and water plants, non-living things such as sand, decorative stones, artificial additions, and an aeration apparatus may be placed.

The light output section 30 outputs (radiates) light into the interior of the aquarium 20. The light output section 30 may also include an illumination apparatus (illumination section) that lights up (outputs light) throughout the interior of the aquarium 20, for example. Additionally, the light output section 30 may also include a projector capable of projection that more finely differentiates the light radiated in each region of the interior of the aquarium 20. Note that the light output section 30 may also include multiple apparatus.

The camera section 40 is an imaging apparatus that images the interior of the aquarium 20 to acquire and provide a captured image to the control section 10. Note that the camera section 40 may also include multiple imaging apparatus.

The display section 50 displays background content.

The optical viewing distance generation section 60, the optical viewing distance generation section 60 generates an optical viewing distance between the aquarium 20 and the background content seen by the user such that the background content appears not to be immediately behind the aquarium 20, but instead farther away. Compared to the case in which the background content appears to be immediately behind the aquarium 20, by making the background content appear to be farther away, it is possible to impart a greater sense of depth. As a result, it is possible for the user to obtain a sensation as though the scenic view included in the background content is actually spread out behind the aquarium 20.

Note that a specific exemplary configuration of the display section 50 and the optical viewing distance generation section 60 will be described later with reference to FIGS. 5 to 7.

The communication section 70 is a communication apparatus for connecting to a communication network not illustrated. Through the communication section 70, the control section 10 may connect to the communication network not illustrated, and acquire background content from an external server or the like connected to the communication network.

The speaker 80 outputs sound under control by the control section 10.

The above describes an exemplary functional configuration of the aquarium system 1 according to the present embodiment. Next, several exemplary apparatus configurations that may realize the aquarium system 1 will be described with reference to FIGS. 5 to 7.

Figure 5:
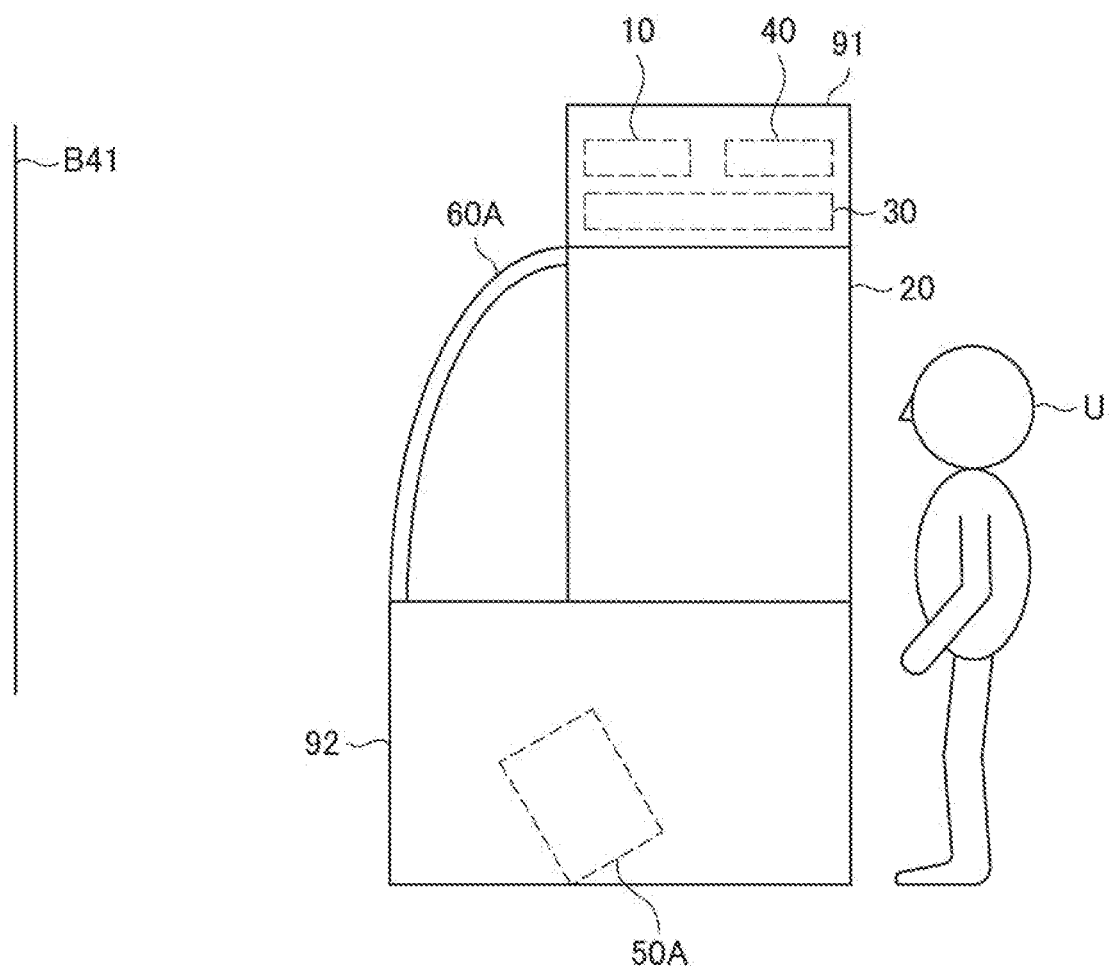
FIG. 5 is a diagram illustrating a first exemplary apparatus configuration according to the embodiment.

FIG. 5 is a diagram illustrating a first exemplary apparatus configuration according to the present embodiment. Referring to FIG. 5, the control section 10, the light output section 30, and the camera section 40 are provided inside a housing 91 disposed above the aquarium 20. Also, in the example illustrated in FIG. 5, a projector 50A that is one example of the display section 50 is provided inside a housing 92 disposed below the aquarium 20. Also, in the example illustrated in FIG. 5, a combiner 60A that is one example of the optical viewing distance generation section 60 is provided on the back side of the aquarium 20 as seen from the user U.

Of the top face of the housing 92, at least the part between the projector 50A and the combiner 60A is configured such that light is transmissible. For example, at least a part of the top face of the housing 92 may be formed from a material that transmits light, such as glass or plastic.

The projector 50A outputs (projects) background content B41 towards the combiner 60A under control by the control section 10. The combiner 60A is an optical member that reflects at least some light, and as illustrated in FIG. 5, causes the background content B41 output by the projector 50A to be seen by the user U and appear at a position a predetermined distance away from the aquarium 20.

Figure 6:
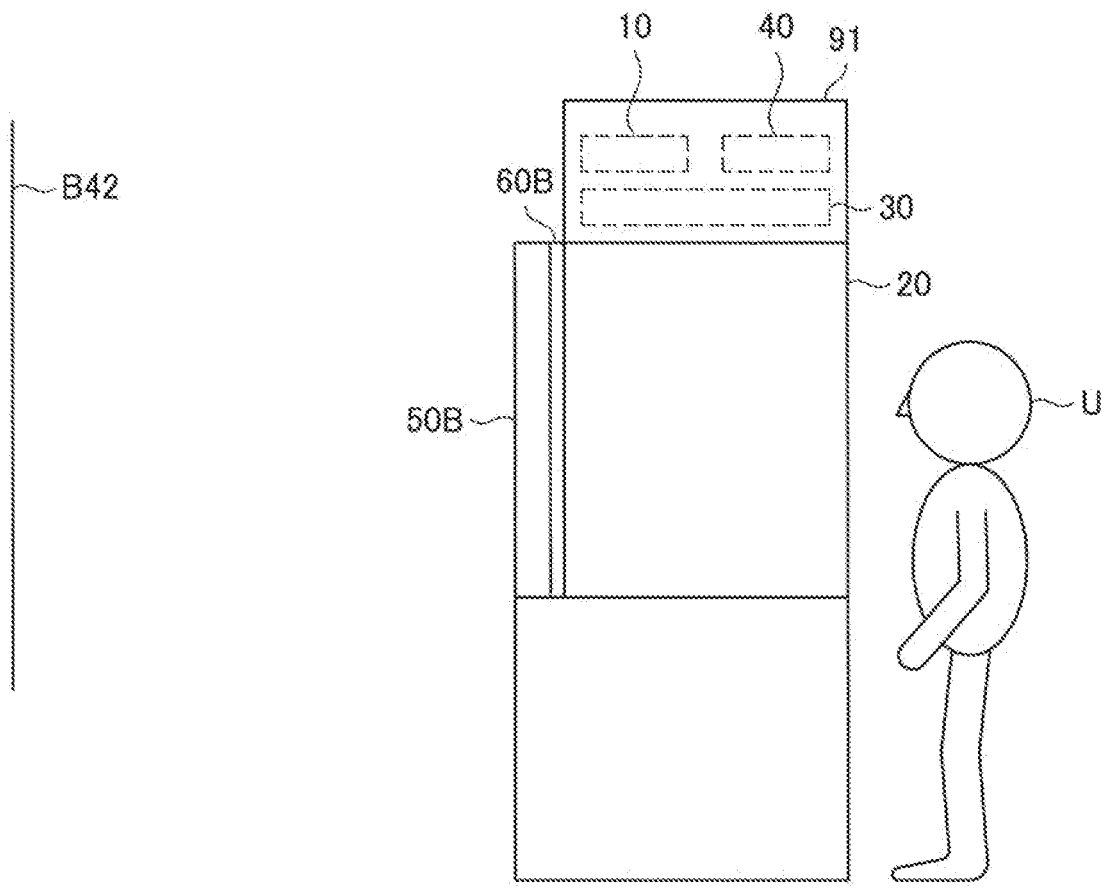
FIG. 6 is a diagram illustrating a second exemplary apparatus configuration according to the embodiment.

FIG. 6 is a diagram illustrating a second exemplary apparatus configuration according to the present embodiment. Referring to FIG. 6, the control section 10, the light output section 30, and the camera section 40 are provided inside a housing 91 disposed above the aquarium 20. Also, in the example illustrated in FIG. 6, a display 50B that is one example of the display section 50 is disposed on the back side of the aquarium 20 as seen from the user U, and a Fresnel lens 60B that is one example of the optical viewing distance generation section 60 is disposed between the aquarium 20 and the display 50B.

The Fresnel lens 60B causes the background content B41 displayed on the display 50B to be seen by the user U and appear at a position a predetermined away from the aquarium 20. Note that it is desirable for the display 50B to have high brightness. Also, the Fresnel lens 60B has a merit of being thin, but the configuration is not limited to such an example, and another lens may also be used. Also, to prevent moiré and lines, the Fresnel lens 60B may also be provided with a low-pass filter.

Figure 7:
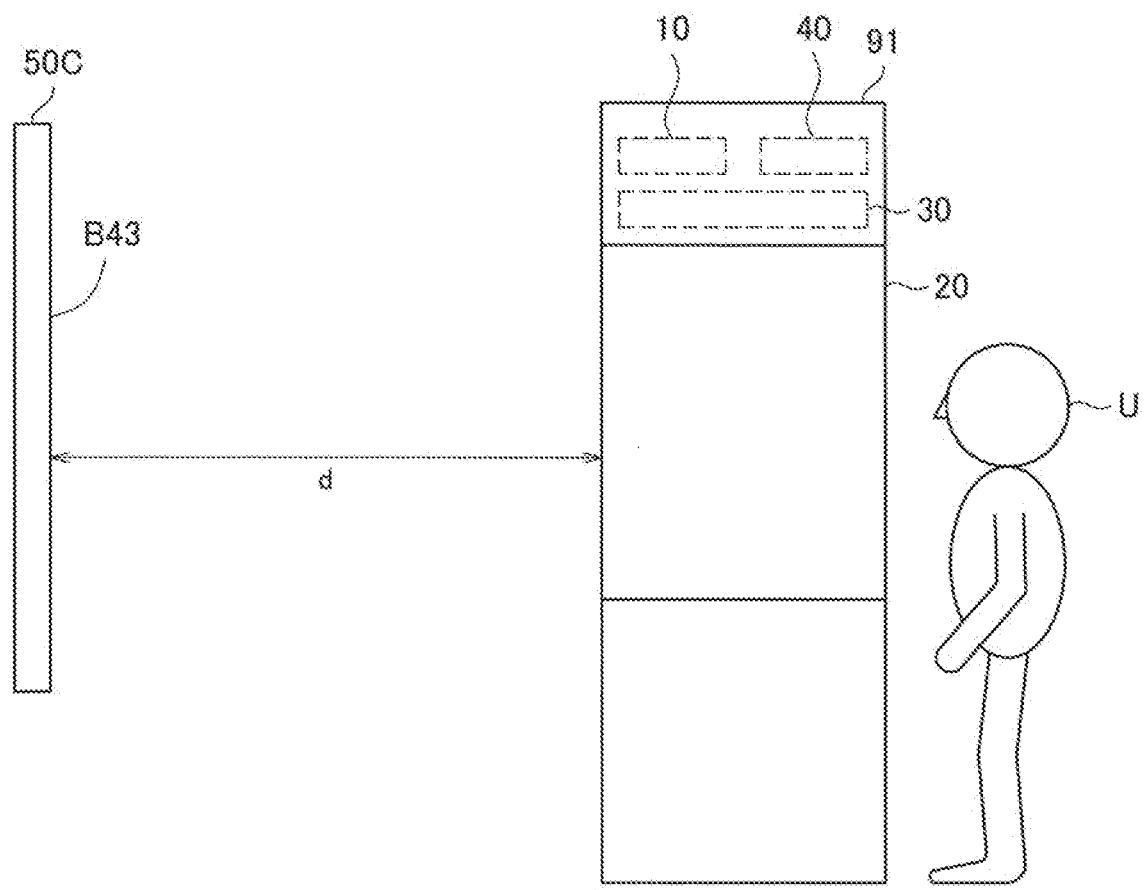
FIG. 7 is a diagram illustrating a third exemplary apparatus configuration according to the embodiment.

FIG. 7 is a diagram illustrating a third exemplary apparatus configuration according to the present embodiment. Referring to FIG. 7, the control section 10, the light output section 30, and the camera section 40 are provided inside a housing 91 disposed above the aquarium 20. Also, in the example illustrated in FIG. 7, a display 50C that is one example of the display section 50 is disposed on the back side of the aquarium 20 as seen from the user U.

The display 50C illustrated in FIG. 7 is disposed farther behind the aquarium 20 as seen from the user U than the display 50B illustrated in FIG. 6, and a distance d is provided between the aquarium 20 and the display 50C. According to such a configuration, as illustrated in FIG. 7, it is possible to make the background content B43 displayed in the display 50C appear at a position a distance d away from the aquarium 20 as seen from the user U.

The above describes exemplary apparatus configurations that may realize the aquarium system 1 with reference to FIGS. 5 to 7, but the apparatus configurations illustrated in FIGS. 5 to 7 are one instance, and the arrangement and combination of each apparatus and the like are not limited to such examples. For example, the control section 10, the light output section 30, and the camera section 40 may be disposed on the side or below the aquarium 20 rather than above. Also, the positions of the communication section 70 and the speaker 80 not illustrated in FIGS. 5 to 7 are not particularly limited. Also, by combining a display and a combiner, it is also possible to display background content to appear at a position a predetermined distance away from the aquarium 20. In addition, the optical viewing distance generation section 60 may also be a configuration that changes the optical viewing distance under control by the control section 10. For example, the optical viewing distance generation section 60 may change the optical viewing distance by driving an optical system such as a lens, or change the viewing distance by physically moving the position of the display section 50 (for example, a display).

Figure 8:
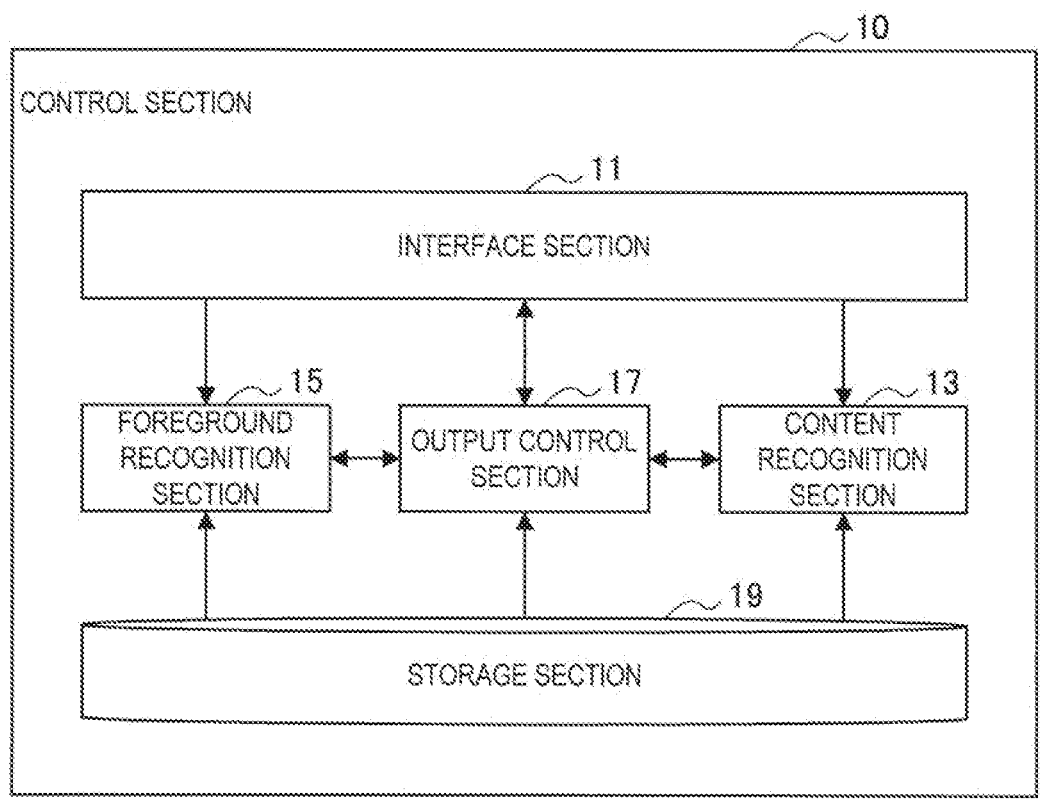
FIG. 8 is a block diagram illustrating an exemplary functional configuration of a control section 10.

Next, a more detailed exemplary functional configuration of the control section 10 will be described with reference to FIG. 8. FIG. 8 is a block diagram illustrating an exemplary functional configuration of the control section 10. Referring to FIG. 8, the control section 10 is an information processing apparatus provided with an interface section 11, a content recognition section 13, a foreground recognition section 15, an output control section 17, and a storage section 19. Note that in the present disclosure, the content recognition section 13 and the foreground recognition section 15 may be simply and collectively called the recognition section.

The interface section 11 is an interface for connecting between the control section 10 and another apparatus. For example, the interface section 11 is connected to the light output section 30, the camera section 40, the display section 50, the communication section 70, and the speaker 80 illustrated in FIG. 4. For example, a control signal or the like that controls light output may be transmitted to the light output section 30 through the interface section 11. Also, a captured image may be received from the camera section 40 via the interface section 11. Also, background content may be transmitted to the display section 50 through the interface section 11. Also, background content may be received from the communication section 70 (more strictly, from an external server or the like through the communication section 70) through the interface section 11. Also, a sound signal may be transmitted to the speaker 80 through the interface section 11.

The content recognition section 13 recognizes the background content displayed in the background of the aquarium 20. Note that in the present embodiment, the background content may be acquired (selected) by the output control section 17 described later, and the content recognition section 13 may recognize the background content acquired by the output control section 17. However, in the case in which the background content displayed in the background of the aquarium 20 is predetermined or the like, the content recognition section 13 may also acquire the background content directly.

The content recognition section 13 recognizes color information about the background content for example. Color information about the background content may include information such as the brightness, hue, and contrast for example.

Also, the content recognition section 13 recognizes light source information about the background content for example. Light source information about the background content may include a light source direction in the background content and information such as the color, light intensity, and fluctuation of the light source in the background content, for example.

Additionally, the content recognition section 13 may also recognize information about the weather (such as sunny, rain, snow, or lightning, for example) in the background content.

The content recognition section 13 provides the color information about the background content, the light source information about the background content, and the information about the weather in the background content described above to the output control section 17 as a background content recognition result.

The foreground recognition section 15 recognizes the interior of the aquarium 20 that acts as the foreground. For example, the foreground recognition section 15 may recognize the interior of the aquarium 20 by analyzing a captured image received from the camera section 40 through the interface section 11.

The foreground recognition section 15 may recognize information about objects in the interior of the aquarium 20 for example. Object information may include information such as the types, positions, sizes, colors, and shapes of objects (living things and non-living things) included in the interior of the aquarium 20 for example.

Additionally, the foreground recognition section 15 may also recognize illumination information about the interior of the aquarium 20. Illumination information may include information such as the intensity (brightness) and color of illumination for example. Note that the foreground recognition section 15 may recognize the illumination information on the basis of the captured image as described above, or recognize the illumination information on the basis of information related to the control of the light output section 30 by the output control section 17.

The foreground recognition section 15 provides the information about objects in the interior of the aquarium 20 and the illumination information about the interior of the aquarium 20 described above to the output control section 17 as a result of recognizing the interior of the aquarium 20.

The output control section 17 controls the output on the basis of the recognition results from the recognition section (the content recognition section 13 and the foreground recognition section 15). For example, the output control section 17 controls the light output by the light output section 30 on the basis of the background content recognition result by the content recognition section 13.

The output control section 17 may also control the light output by the light output section 30 on the basis of the color information about the background content recognized by the content recognition section 13, such that a color included in the background content and a color of the interior of the aquarium 20 are similar. Such an example will be described later with reference to FIG. 10.

In addition, the output control section 17 may also control the light output by the light output section 30 on the basis of the light source information about the background content recognized by the content recognition section 13.

For example, the output control section 17 may also control the light output by the light output section 30 on the basis of the information about the light source direction in the background content, such that shadows in the interior of the aquarium 20 are consistent with the light source direction. To make the shadows in the interior of the aquarium 20 consistent with the light source direction in the background content, the output control section 17 may control the light output by the light output section 30 on the additional basis of the result of recognizing the interior of the aquarium 20 by the foreground recognition section 15. Such an example will be described later with reference to FIGS. 11 and 12.

For example, the output control section 17 may also control the light output by the light output section 30 on the basis of the information about the color of the light source in the background content, such that the color of the interior of the aquarium 20 is consistent with the color of the light source. Such an example will be described later with reference to FIG. 12.

In addition, the output control section 17 may also control the light output by the light output section 30 on the basis of the information about the weather in the background content recognized by the content recognition section 13. Such an example will be described later with reference to FIG. 13.

In addition, the output control section 17 may also control the output (display) of background content by the display section 50 on the basis of the result of recognizing the interior of the aquarium 20 by the foreground recognition section 15. In such a case, the output control section 17 may select and cause the display section 50 to display appropriate background content from among background content stored in the storage section 19 or background content acquired from an external server through the interface section 11.

For example, the output control section 17 may control the output of background content on the basis of the information about objects in the interior of the aquarium 20, and on the basis of the object information, cause background content including objects similar to the objects included in the interior of the aquarium 20 to be output. Such an example will be described later with reference to FIGS. 14 to 16.

In addition, the output control section 17 may control the output of background content on the basis of illumination information about the interior of the aquarium 20, and on the basis of the illumination information about the interior of the aquarium 20, cause background content corresponding to the brightness and color of the illumination in the interior of the aquarium 20 to be displayed.

Also, the output controlled by the output control section 17 is not limited to the light output by the light output section 30 and the output of background content by the display section 50. For example, the output control section 17 may also control the output of sound by the speaker 80 according to the background content. Additionally, the output control section 17 may also control the injection of drugs, control the injection of feed, control aeration, and the like by various apparatus not illustrated on the basis of a result of foreground recognition or background recognition. In particular, by controlling the injection of drugs, the output control section 17 is capable of controlling the optical properties of the aquarium interior.

The storage section 19 stores programs and data such as parameters by which the control section 10 executes each function. The storage section 19 may store background content, and may also store meta information such as the types of objects included in background content and categories of background content in association with the background content.

The above describes a more detailed exemplary functional configuration of the control section 10 according to the present embodiment. Note that the functional configuration of the control section 10 illustrated in FIG. 8 is one instance, and the present embodiment is not limited to such an example. For example, some of the functions illustrated in FIG. 8 may also be provided in another apparatus, such as the function of the foreground recognition section 15 being provided in the camera section 40 illustrated in FIG. 4 for example.

3. OPERATIONS

Figure 9:
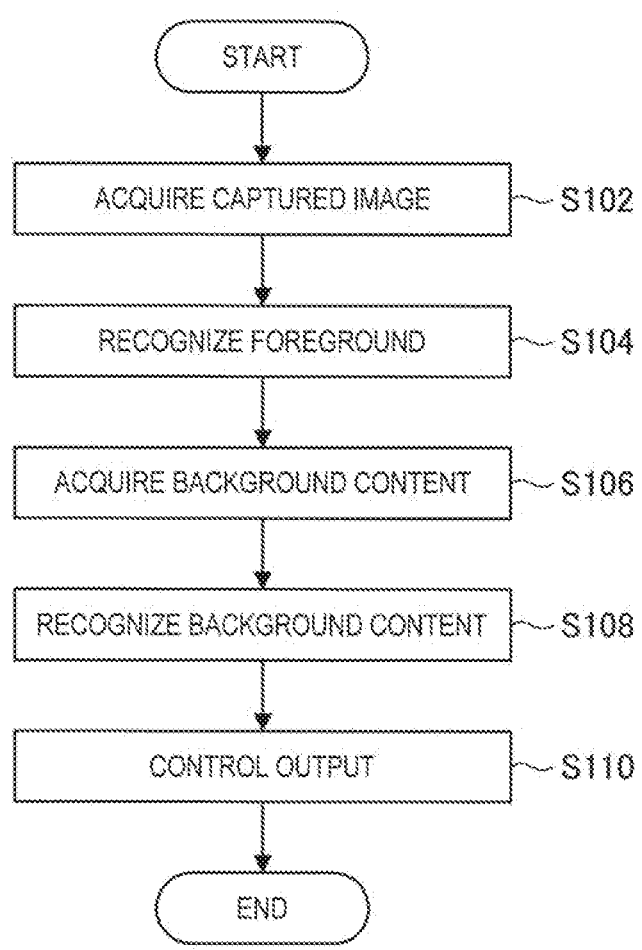
FIG. 9 is a flowchart for explaining exemplary operations of the embodiment.

FIG. 9 is a flowchart for explaining exemplary operations of the present embodiment. Referring to FIG. 9, first a captured image acquired by the camera section 40 imaging the interior of the aquarium 20 is provided to the control section 10 (S102). Next, the foreground recognition section 15 of the control section 10 recognizes the interior of the aquarium 20 that acts as the foreground (S104).

Next, the output control section 110 acquires background content on the basis of the result of recognizing the interior of the aquarium 20 in step S104 (S106). Note that the acquisition of background content is not limited to the example of being executed on the basis of the result of recognizing the interior of the aquarium 20, and background content may also be acquired in a predetermined sequence or randomly, for example.

Next, the content recognition section 13 recognizes the background content acquired in step S106 (S108).

Next, on the basis of the background content recognition result in step S108, the output control section 110 controls the light output by the light output section 30 and also causes the display section 50 to output (display) the background content acquired in step S106 (S110).

With this arrangement, it becomes possible to control the output of light into the interior of the aquarium 20 that acts as the foreground in conjunction with the background content.

Note that the illustration in FIG. 9 is one instance, and operations according to the present embodiment are not limited to such an example. For example, it is not necessary for each step in the present embodiment to be processed in a time series following the sequence described in FIG. 9, and each of the steps may also be processed in a different sequence from the sequence described in FIG. 9, or processed in parallel.

4. SPECIFIC EXAMPLES

The above describes an exemplary configuration and exemplary operations according to the present embodiment. Next, several specific examples of output control according to the present embodiment described above will be described with reference to FIGS. 10 to 16.

First Specific Example

Figure 10:
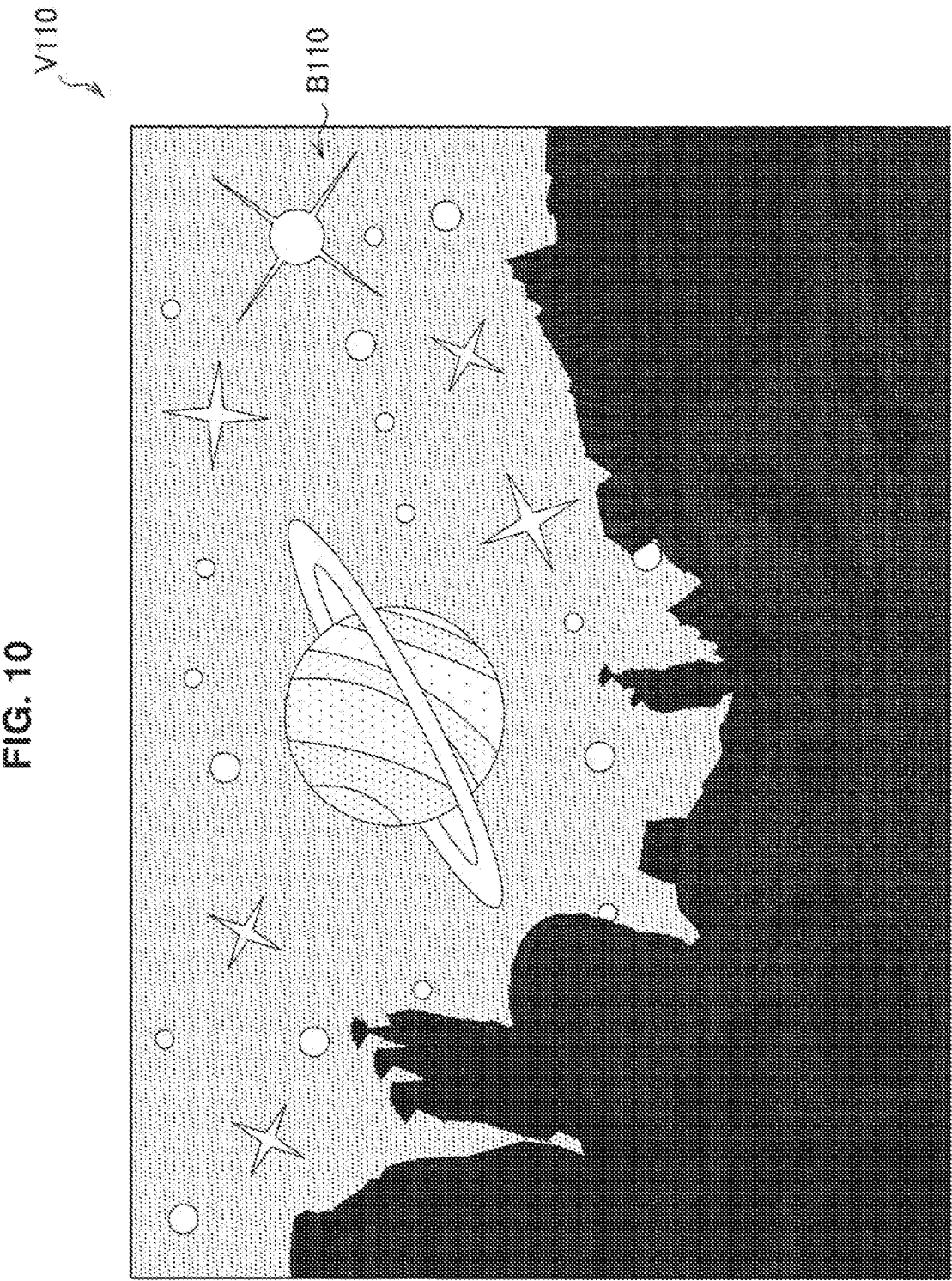
FIG. 10 is a diagram illustrating a first specific example of output control according to the embodiment.

FIG. 10 is a diagram illustrating a first specific example of output control according to the present embodiment. In the user's field of view V110 illustrated in FIG. 10, the interior of the aquarium 20 and an image of outer space displayed in the background of the aquarium 20 as background content B110 are combined and visually perceived.

In the example illustrated in FIG. 10, the content recognition section 13 may recognize color information about the background content B110. Herein, as illustrated in FIG. 10, the background content B110 is an image of outer space, and the brightness is extremely dark (small). Accordingly, the output control section 17 controls the light output (for example, turns off the light output by the light output section 30) such that the color of the background content B110 and the color of the interior of the aquarium 20 become similar, for example such that the interior of the aquarium 20 becomes dark.

Note that although FIG. 10 illustrates an example in which the background content B110 is an image of outer space, similar control is also possible in the case of an image of a night view, for example. In this way, by controlling the light output on the basis of the color information about the background content, a scene that feels like a cohesive whole is visually perceived in the user's field of view.

Second Specific Example

Figure 11:
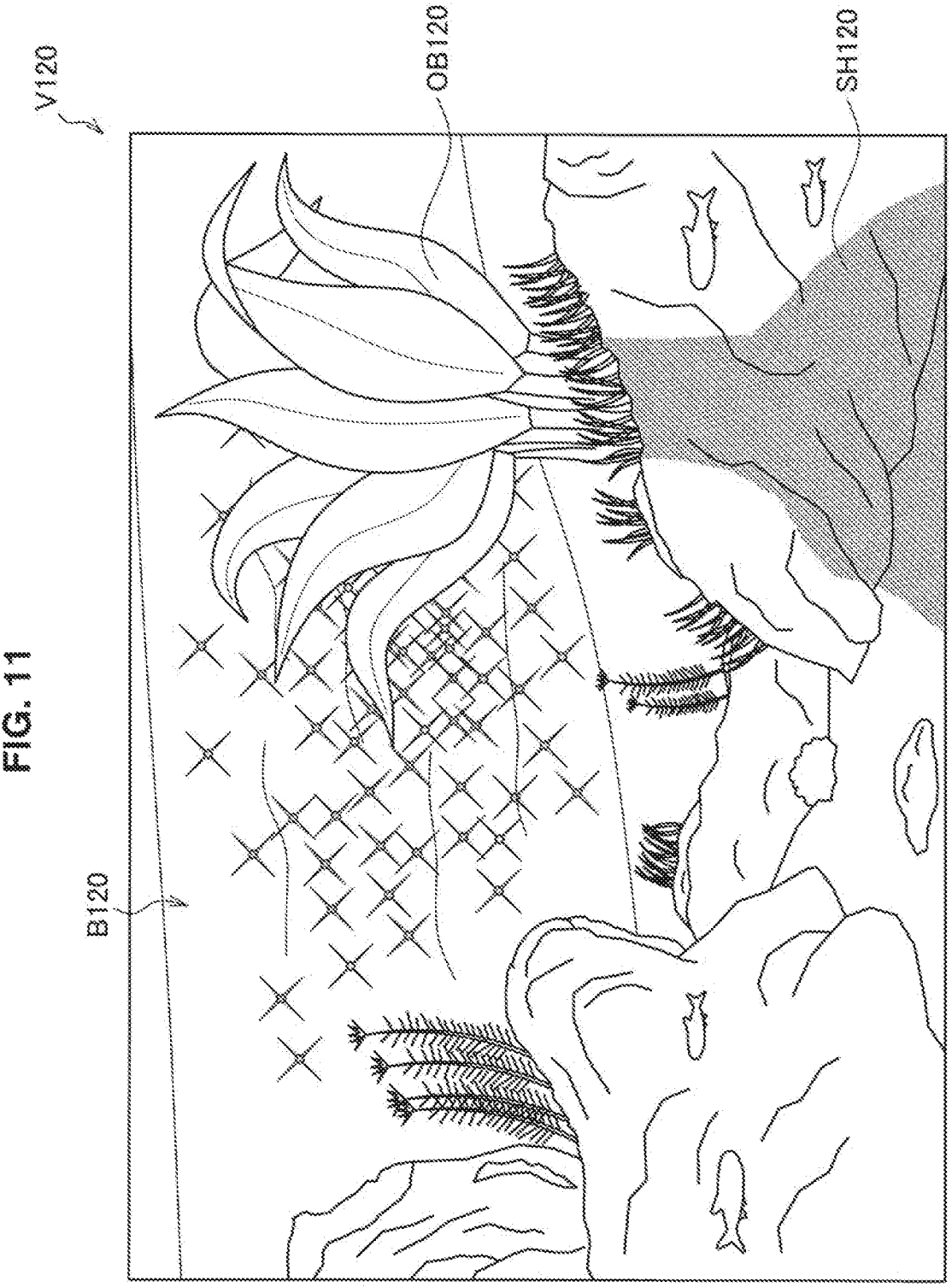
FIG. 11 is a diagram illustrating a second specific example of output control according to the embodiment.

FIG. 11 is a diagram illustrating a second specific example of output control according to the present embodiment. In the user's field of view V120 illustrated in FIG. 11, the interior of the aquarium 20 and an image of a river flowing through a forest displayed in the background of the aquarium 20 as background content B120 are combined and visually perceived.

In the example illustrated in FIG. 11, the content recognition section 13 recognizes light source information about the background content B120. Also, the foreground recognition section 15 may recognize information about objects in the interior of the aquarium 20, and may recognize information related to a plant OB120 (one example of an object) in the interior of the aquarium 20 for example. Additionally, on the basis of the light source information and the object information, the output control section 17 may control the light output such that the light source direction in the background content B120 and shadows in the interior of the aquarium 20 are consistent for example.

For example, as illustrated in FIG. 11, the output control section 17 may controls the light output (for example, the light output of a projector included in the light output section 30) such that a shadow SH120 consistent with the light source direction of the background content B120 is visually perceived as the shadow of the object OB120 in the interior of the aquarium 20.

Note that the output control section 17 may control the light output on the additional basis of the intensity and fluctuation of light in the background content and also the contrast and the like of the background content. By controlling the light output in this way, the consistency between the foreground and the background is maintained, and the user feels as though the background is connected behind the foreground.

Third Specific Example

FIG. 12 is a diagram illustrating a third specific example of output control according to the present embodiment. In the user's field of view V131 and field of view V132 illustrated in FIG. 12, the interior of the aquarium 20 and an image of a mountain at different times displayed in the background of the aquarium 20 as each of the background content B131 and the background content B132 are combined and visually perceived.

In the example illustrated in FIG. 12, the content recognition section 13 recognizes light source information about each of the background content B131 and the background content B132, and the foreground recognition section 15 may recognize information about objects in the interior of the aquarium 20. In the example illustrated in FIG. 12, the light source information may include information such as the light source direction, the light intensity, and the color of the sun included in the background content B131 and the background content B132. Additionally, the output control section 17 may also control the light output on the basis of the light source information and the object information.

For example, in the case in which an image of a mountain in the daytime is displayed as the background content B131 like the field of view V131 illustrated in FIG. 12, the output control section 17 may control the light output such that the interior of the aquarium 20 is illuminated brightly by the light output section 30. On the other hand, in the case in which an image of a mountain at dusk is displayed as the background content B132 like the field of view V132 illustrated in FIG. 12, the output control section 17 may control the light output such that the interior of the aquarium 20 is illuminated by the light output section 30 more darkly and more red than the example of the field of view V131.

Note that in either case, the output control section 17 may control the light output on the basis of the information about objects in the interior of the aquarium 20 such that the light source direction of the sun included in each of the background content B131 and the background content B132 and the shadows in the interior of the aquarium 20 are consistent.

Also, although FIG. 12 only illustrates the case of daytime and the case of dusk, the output control section 17 may also cause background content to be output such that the position, light intensity, and the like of the sun in the background content changes depending on the time (for example, in synchronization with the actual time). Additionally, the output control section 17 may also change the light output according to the change of the background content.

Fourth Specific Example

FIG. 13 is a diagram illustrating a fourth specific example of output control according to the present embodiment. In the user's field of view V141 and field of view V142 illustrated in FIG. 13, the interior of the aquarium 20 and an image of a thundercloud displayed in the background of the aquarium 20 as each of the background content B141 and the background content B142 are combined and visually perceived.

In the example illustrated in FIG. 13, the content recognition section 13 may recognize weather information about each of the background content B141 and the background content B142. In the example illustrated in FIG. 13, the weather information may be information indicating that lightning is striking far away in the background content B141, that lightning is striking nearby in the background content B142, and the like. Additionally, the output control section 17 may also control the light output on the basis of such weather information.

For example, in the case in which an image of a thundercloud with lightning striking far way is displayed as the background content B141 like the field of view V141 illustrated in FIG. 13, the output control section 17 may control the light output such that the interior of the aquarium 20 becomes darker. On the other hand, in the case in which an image of a thundercloud with lightning striking nearby is displayed as the background content B142 like the field of view V142 illustrated in FIG. 13, the output control section 17 may control the light output such that the interior of the aquarium 20 is illuminated by the light output section 30 more brightly than the example of the field of view V141.

Note that although FIG. 13 only illustrates cases in which the background content B141 and the background content B142 are displayed, the output control section 17 may also cause background content to be output such that the weather in the background content changes depending on the time (for example, in synchronization with the actual weather). Additionally, the output control section 17 may also change the light output according to the change of the weather in the background content.

Fifth Specific Example

Figure 14:
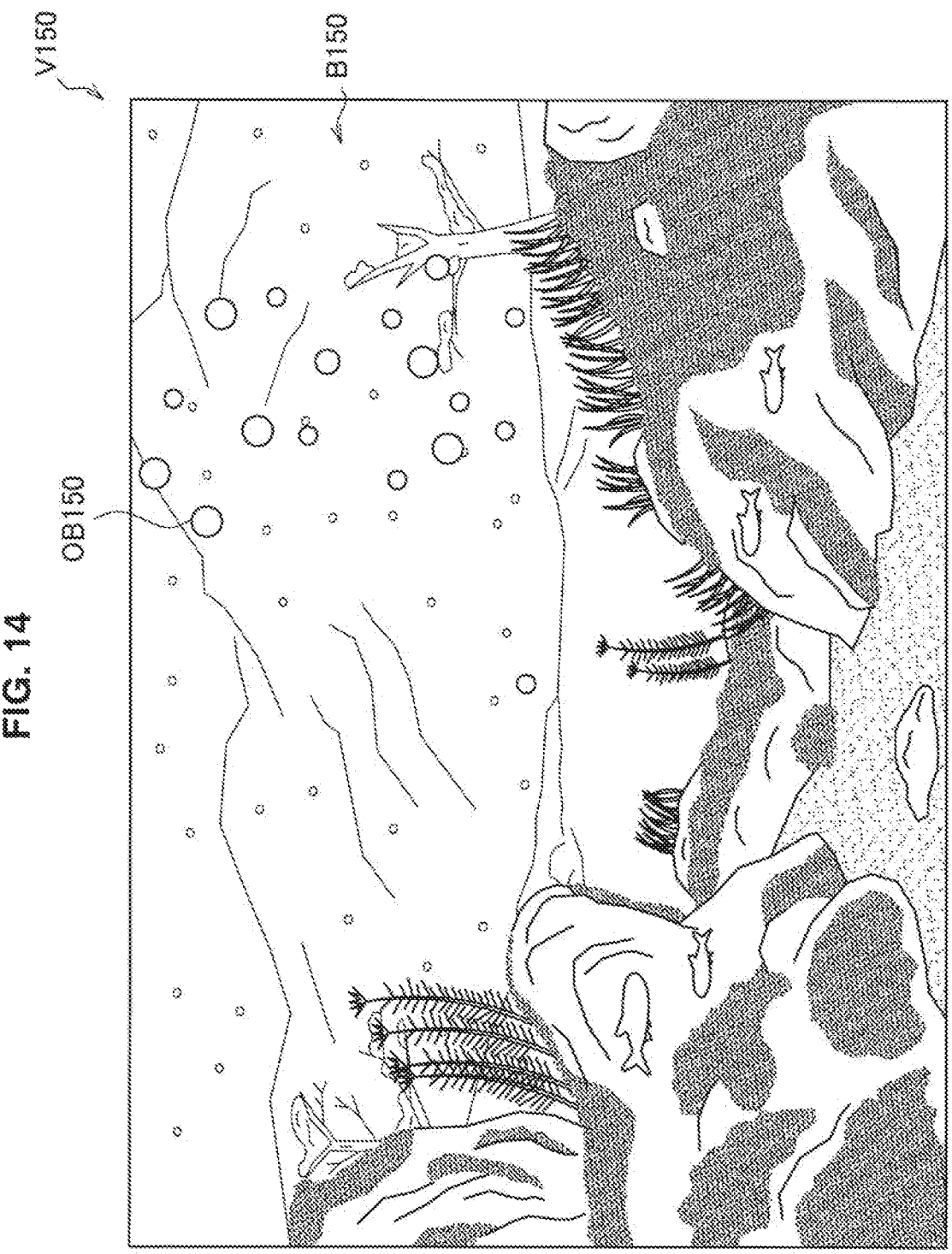
FIG. 14 is a diagram illustrating a fifth specific example of output control according to the embodiment.

FIG. 14 is a diagram illustrating a fifth specific example of output control according to the present embodiment. The foreground recognition section 15 may recognize information about objects in the interior of the aquarium 20, and in the example illustrated in FIG. 14, may recognize information related to bubbles OB150 (one example of an object) due to aeration. Additionally, the output control section 17 controls the output of background content on the basis of the object information.

In the example illustrated in FIG. 14, in conformity with the occurrence of the bubbles OB150, an image of a snowy scene is selected by the output control section 17 as the background content B150, and in the user's field of view V150, the interior of the aquarium 20 and the background content B150 displayed in the background of the aquarium 20 are combined and visually perceived.

Sixth Specific Example

Figure 15:
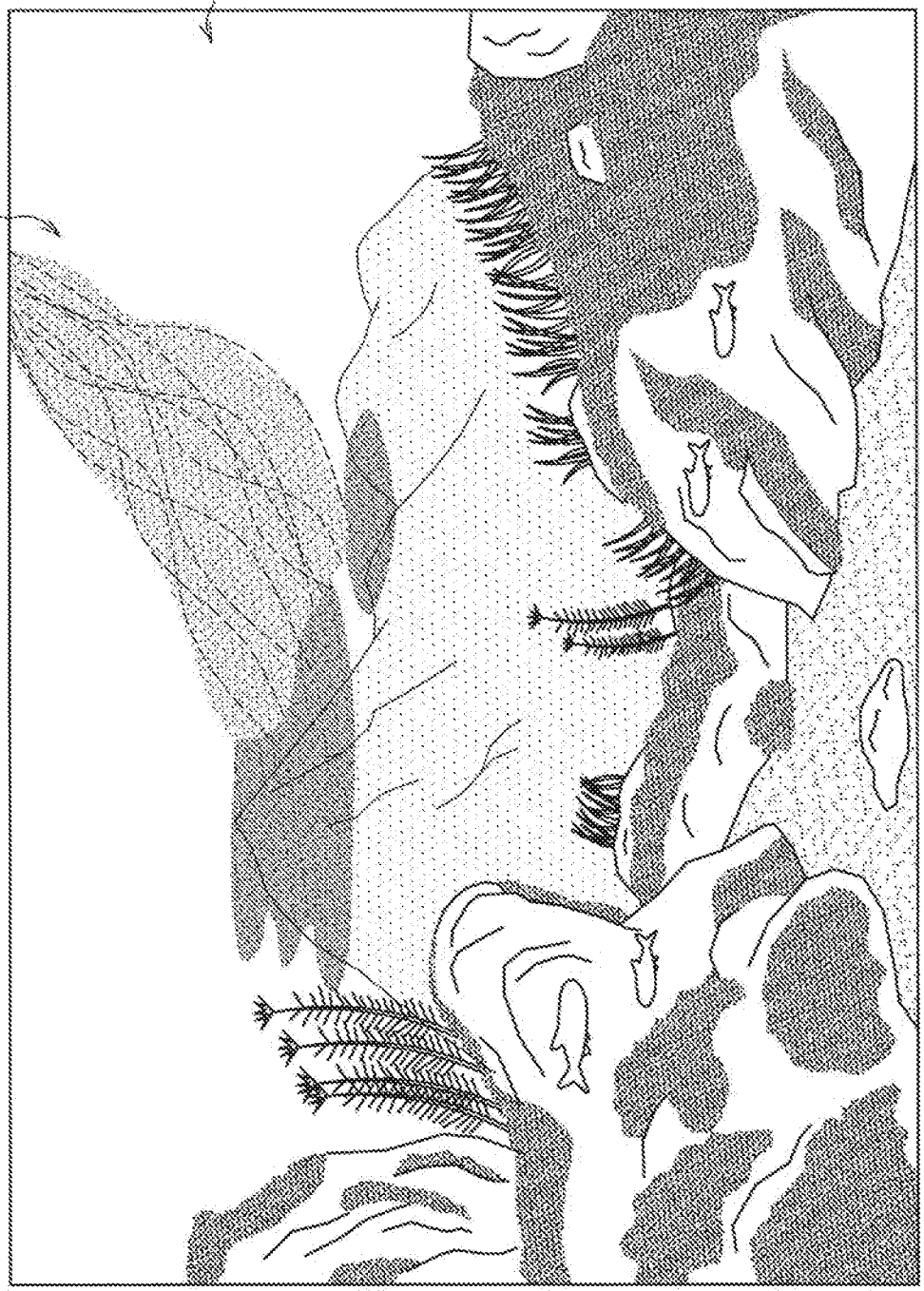
FIG. 15 is a diagram illustrating a sixth specific example of output control according to the embodiment.

FIG. 15 is a diagram illustrating a sixth specific example of output control according to the present embodiment. The foreground recognition section 15 may recognize information about objects in the interior of the aquarium 20, and in the example illustrated in FIG. 15, may recognize information related to a drug OB160 (one example of an object) injected for maintenance. Additionally, the output control section 17 controls the output of background content on the basis of the object information.

In the example illustrated in FIG. 15, in conformity with the injection of the drug OB160, an image of a foggy landscape is selected by the output control section 17 as the background content B160, and in the user's field of view V160, the interior of the aquarium 20 and the background content B160 displayed in the background of the aquarium 20 are combined and visually perceived.

Seventh Specific Example

Figure 16:
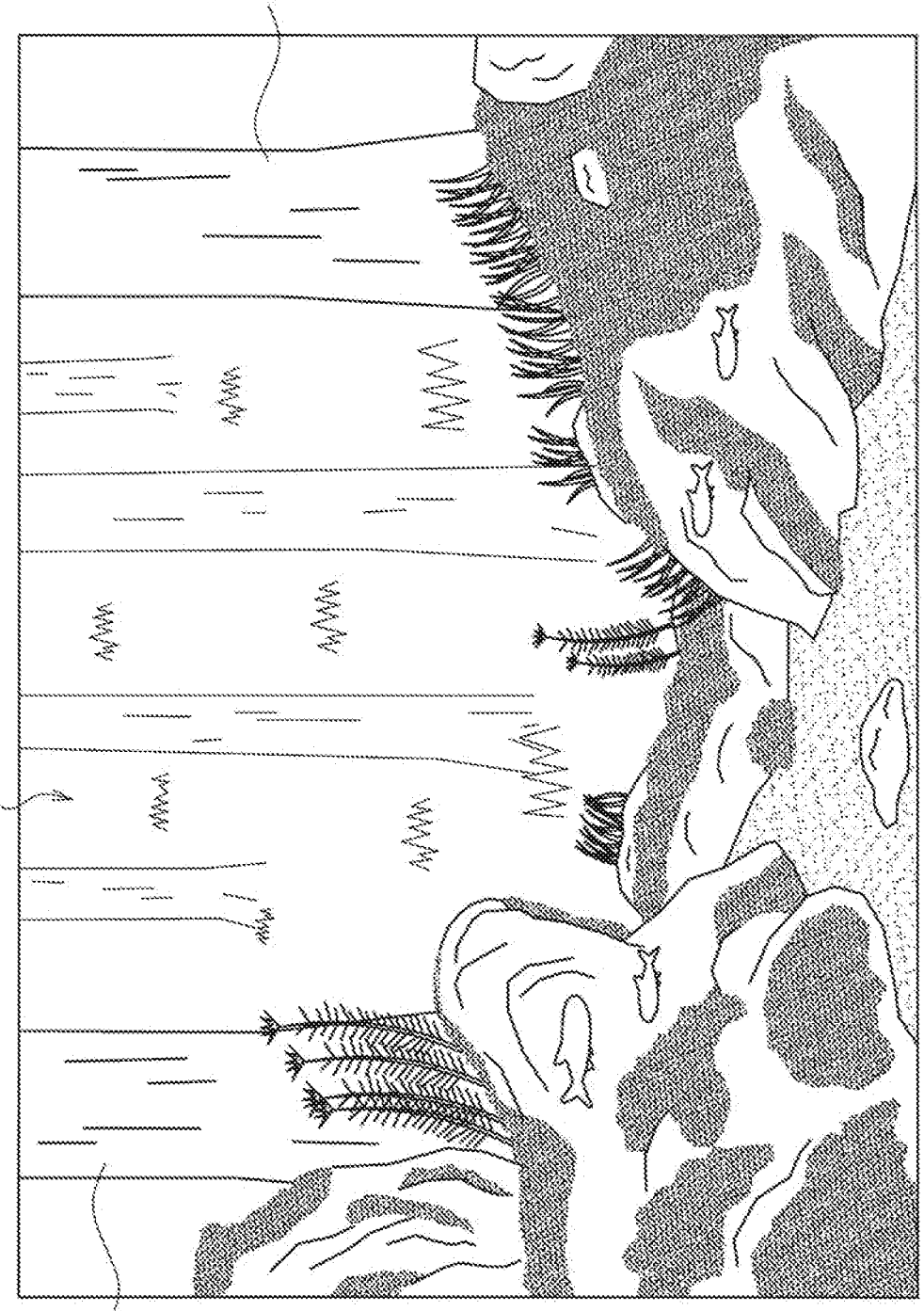
FIG. 16 is a diagram illustrating a seventh specific example of output control according to the embodiment.

FIG. 16 is a diagram illustrating a seventh specific example of output control according to the present embodiment. The foreground recognition section 15 may recognize information about objects in the interior of the aquarium 20, and in the example illustrated in FIG. 16, may recognize information related to a plant OB171 and a plant OB172 (one example of an object). Additionally, the output control section 17 controls the output of background content on the basis of the object information.

In the example illustrated in FIG. 16, an image including plants similar to the plant OB171 and the plant OB172 is selected or generated by the output control section 17 as the background content B170. Additionally, in the user's field of view V170, the interior of the aquarium 20 and the background content B170 displayed in the background of the aquarium 20 are combined and visually perceived. By causing background content to be output in this way, to the user, the background content B170 appears to be a continuation of the foreground in the depth direction, making it possible to provide a scene in which a forest is recreated.

The above references FIGS. 10 to 16 to describe specific examples of the output control according to the present embodiment, but the examples described above are one instance, and the present embodiment is not limited to such examples.

For example, in some cases purple light may be radiated for the photosynthesis of living things (such as water plants) included in the aquarium 20. In such cases, the output control section 17 may cause an image of a glacier to be output (displayed) as background content corresponding to the purple light on the basis of illumination information about the interior of the aquarium 20 recognized by the foreground recognition section 15.

Also, the output control section 17 may cause various background content to be output depending on the condition of living things (one example of objects) in the interior of the aquarium 20 recognized by the foreground recognition section 15.

For example, in the case of recognizing that baby ornamental fish have been born in the interior of the aquarium 20, the output control section 17 may cause the display section 50 to output (display) an image congratulating the birth as the background content, and also cause the speaker 80 to output sound congratulating the birth.

In addition, according to the stage of growth of the ornamental fish in the interior of the aquarium 20, the output control section 17 may cause the display section 50 to output (display) an image of the location where the ornamental fish live during that stage of growth as the background content.

In addition, the output control section 17 may also control the output (display) of background content such that the background content changes according to the recognized movement (change of position) of the ornamental fish in the interior of the aquarium 20. For example, the movement speed of the background content may be changed according to the movement speed of the ornamental fish. Alternatively, the image treated as the background content may be switched according to the movement of the ornamental fish, and for example a switch from an upstream image to a downstream image (or the reverse) may be controlled.

Also, the output control section 17 may control the output of background content according to the recognized type of ornamental fish in the interior of the aquarium 20, and for example, may cause an image of a region or location where ornamental fish of that type live to be output (displayed) as the background content.

5. MODIFICATIONS

The above describes one embodiment of the present disclosure. Hereinafter, several modifications of the present embodiment will be described. Note that the modifications described hereinafter may be applied to the present embodiment individually, or applied to the present embodiment in combination with each other. Also, each modification may be applied as a substitute for the configuration described in the present embodiment, or applied in addition to the configuration described in the present embodiment.

(Modification 1)

In the foregoing embodiment, as examples of the output of light into the interior of the aquarium 20 by the light output section 30, an example of radiating the interior of the aquarium 20 as a whole by an illumination apparatus and an example of more finely differentiating the light radiated in each region of the interior of the aquarium 20 by a projector are described. However, the present embodiment is not limited to such examples.

For example, a reflective film may be disposed in the interior of the aquarium 20, and the output control section 17 may control a projector that is one example of the light output section 30 to control the light output such that light is projected at the reflective film. According to such a configuration, the output control section 17 is able to display a virtual object in the interior of the aquarium 20, and the superimposition (hereinafter called AR superimposition) of an image onto a real space by what is called augmented reality (AR) technology is achieved. Note that the virtual object that the output control section 17 causes to be displayed in the interior of the aquarium 20 may be a three-dimensional object, a character string, or an image.

For example, by controlling the light output such that a virtual object corresponding to a result of recognizing the background content is superimposed by AR, the output control section 17 is also able to achieve advantageous effects similar to the example of light output described above, making it possible to realize a space in which the foreground and the background have a greater sense of unity.

Also, a hologram light guide plate may be provided on the user side of the aquarium 20, and in such a case, by controlling the light output of a projector (light output section 30) that projects light onto the hologram light guide plate, the output control section 17 is able to realize similar AR superimposition.

(Modification 2)

Also, the foregoing embodiment describes an example in which the output control section 17 controls the light output and the output of background content on the basis of recognition results from the recognition section (the content recognition section 13 and the foreground recognition section 15), but the present embodiment is not limited to such an example.

For example, control information in which the light output and the output of background content are associated in advance to work together may be stored in the storage section 19, and in such a case, the output control section 17 may read out such control information from the storage section 19 and control the output.

(Modification 2)

Also, the foregoing embodiment describes an example in which an image acquired from an external server or an image stored in the storage section 19 is output as background content, but the present embodiment is not limited to such an example.

For example, the output control section 17 may also cause an image obtained on the basis of imaging the interior of the aquarium 20 by the camera section 40 to be output. At this point, the image obtained on the basis of imaging may be the captured image itself or an image obtained by composition based on multiple captured images.

For example, the output control section 17 may also cause the captured image itself to be output, and by such a configuration, the user is able to view the interior of the aquarium 20 from a different direction than the direction in which one is currently looking, namely from the image capture direction of the camera section 40.

In addition, the output control section 17 may also cause a free viewpoint image obtained by composition based on multiple captured images acquired at the same time by multiple imaging apparatus included in the camera section 40 to be output. In such a case, the viewpoint may be freely changeable by the user using an operation section not illustrated, and by such a configuration, the user is able to view the interior of the aquarium 20 from a desired direction.

(Modification 4)

Also, the foregoing embodiment describes an example of viewing the aquarium 20 from the horizontal direction, but the present embodiment is not limited to such an example. For example, an exemplary configuration whereby the aquarium 20 is viewed from above in the vertical direction is achievable.

Figure 17:
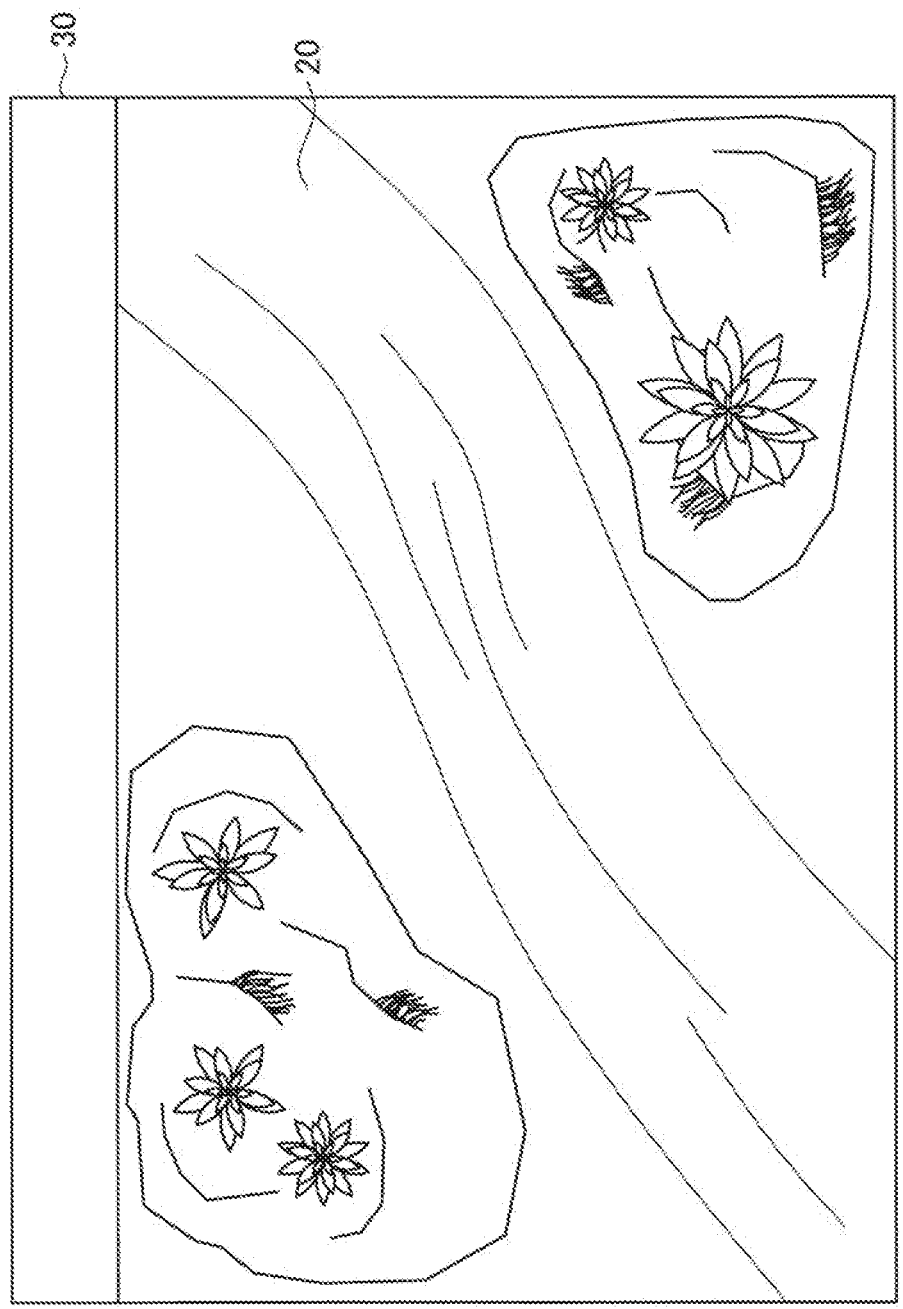
FIG. 17 is a diagram illustrating an exemplary configuration of a case of viewing an aquarium 20 from above in the vertical direction.

FIG. 17 is a diagram illustrating an exemplary configuration of a case of viewing an aquarium 20 from above in the vertical direction. Note that FIG. 17 is a view of the aquarium 20 from above in the vertical direction. As illustrated in FIG. 17, in the case of a configuration in which the aquarium 20 is viewed from above in the vertical direction, the background content preferably is displayed underneath the aquarium 20 by a display section not illustrated. Also, as illustrated in FIG. 17, the light output section 30 may be disposed on a side of the aquarium 20.

(Modification 5)

Also, the foregoing embodiment describes an example in which the present technology is applied to an aquarium system, but is not limited to such an example. The present technology is applicable in a variety of situations.

Figure 18:
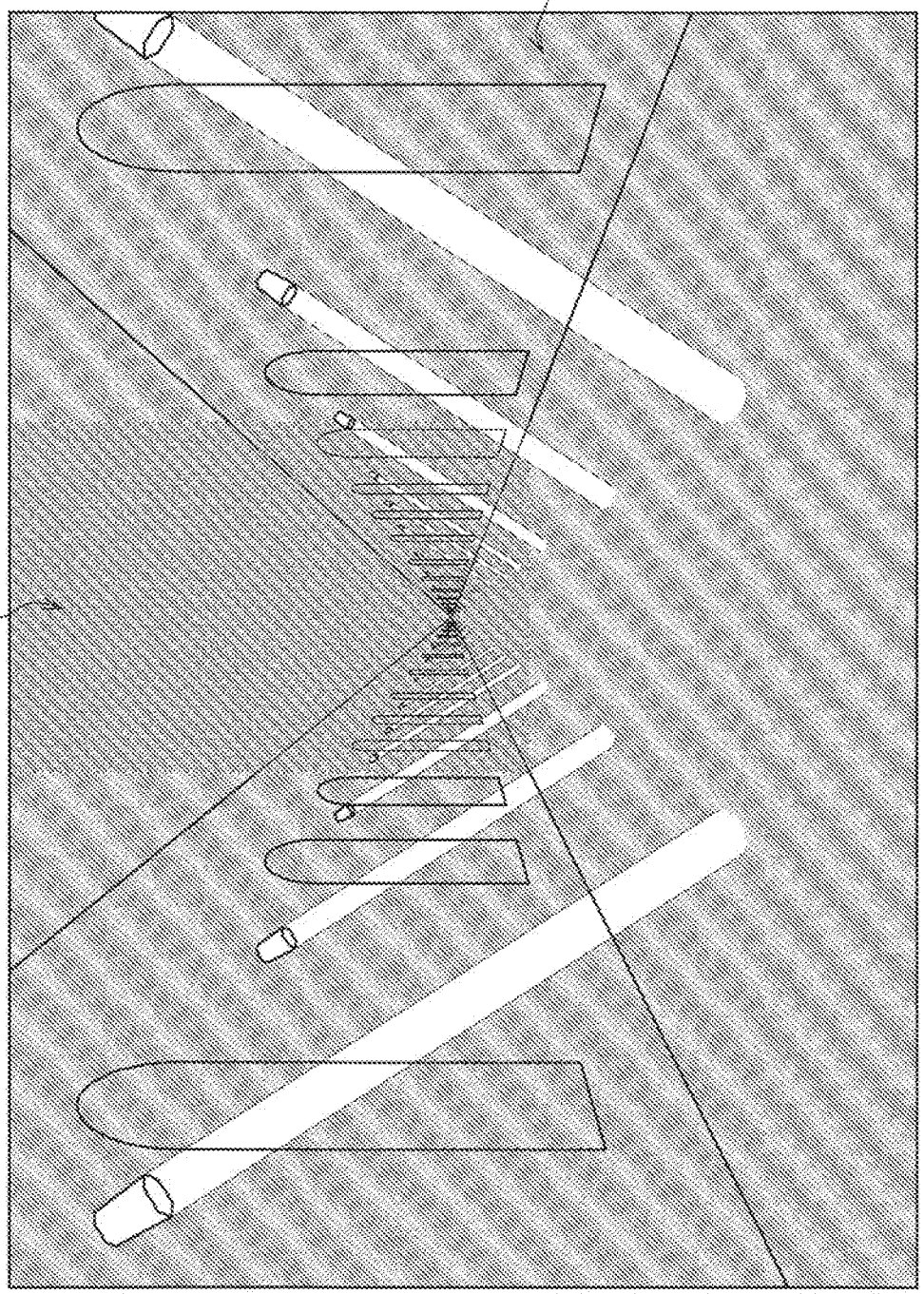
FIG. 18 is a diagram illustrating an example of a case of applying the present technology to a museum.

FIG. 18 is a diagram illustrating an example of a case of applying the present technology to a museum. In the example illustrated in FIG. 18, on the basis of a result of recognizing a foreground, namely a wall F210 of the museum, background content B210 is displayed in the background as though continuing on from the wall F210 in the depth direction. In the example illustrated in FIG. 18, similarly to the example described above, light source information may also be recognized, and the background content B210 is displayed such that the light rays also appear to continue infinitely in the depth direction. By such a configuration, a user is able to feel like one is in a broader space than the breadth of the actual room (museum).

Note that although FIG. 18 illustrates an example in which the present technology is applied to a museum, the same applies even in other situations. For example, the technology described above is applicable when treating a diorama model, a zoo, plants, or the like as the foreground.

6. HARDWARE CONFIGURATION EXAMPLE

Figure 19:
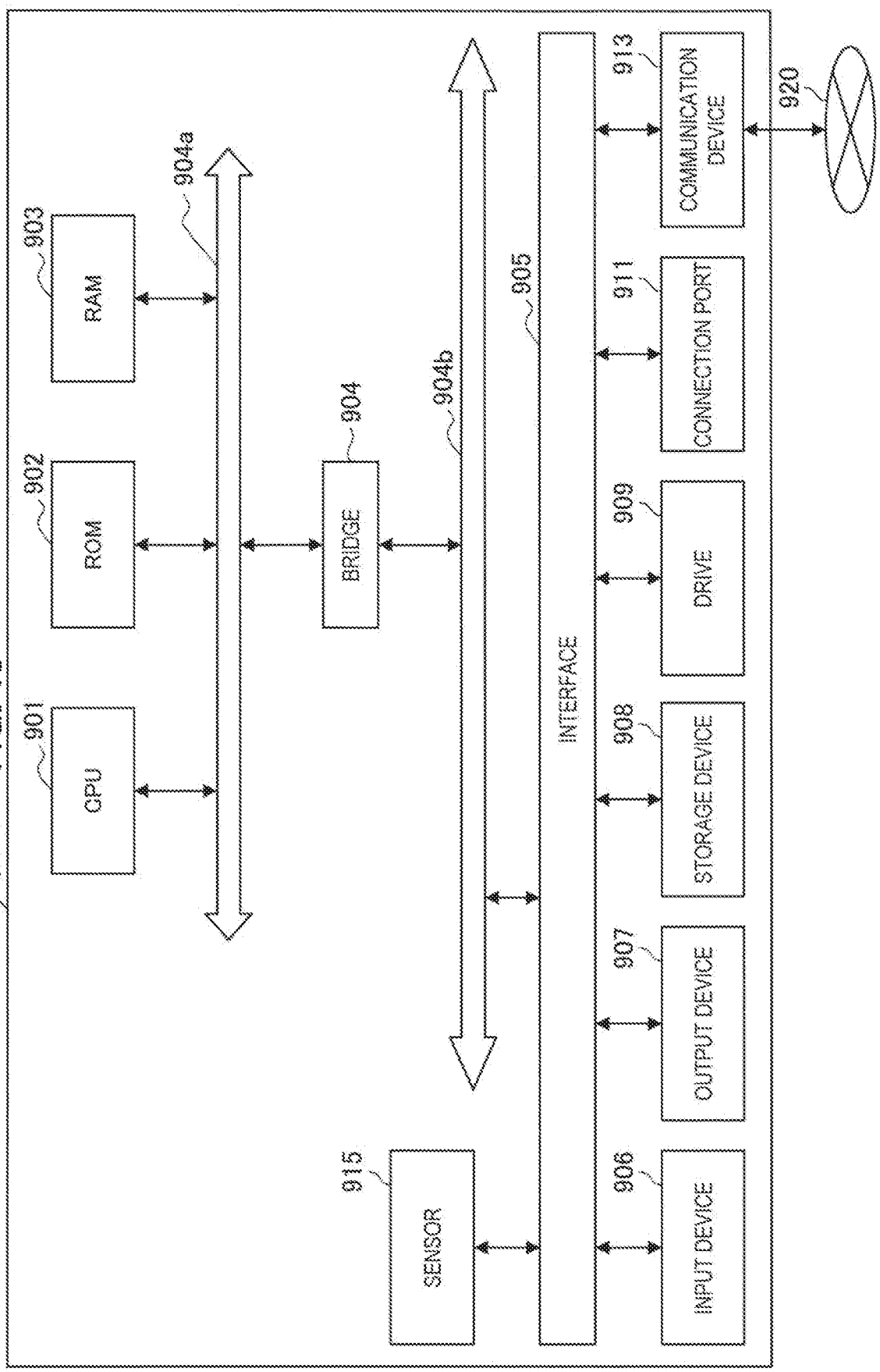
FIG. 19 is a block diagram illustrating one example of a hardware configuration.

The embodiment of the present disclosure has been described hitherto. Next, a hardware configuration of an information processing apparatus according to the present embodiment of the present disclosure will be described with reference to FIG. 19. FIG. 19 is a block diagram illustrating an example of the hardware configuration of the information processing apparatus according to the present embodiment of the present disclosure. Meanwhile, an information processing apparatus 900 illustrated in FIG. 19 may realize the control section 10 illustrated in FIGS. 4 and 8, for example. Information processing by the control section 10 according to the present embodiment is realized according to cooperation between software and hardware described below.

As illustrated in FIG. 19, the information processing apparatus 900 includes a central processing unit (CPU) 901, read-only memory (ROM) 902, random access memory (RAM) 903, and a host bus 904a. In addition, the information processing apparatus 900 includes a bridge 904, an external bus 904b, an interface 905, an input device 906, an output device 907, a storage device 908, a drive 909, a connection port 911, a communication device 913, and a sensor 915. The information processing apparatus 900 may include a processing circuit such as a DSP or an ASIC instead of the CPU 901 or along therewith.

The CPU 901 functions as an arithmetic processing device and a control device and controls the overall operation in the information processing apparatus 900 according to various programs. Further, the CPU 901 may be a microprocessor. The ROM 902 stores programs, operation parameters, and the like used by the CPU 901. The RAM 903 temporarily stores programs used in execution of the CPU 901, parameters appropriately changed in the execution, and the like. The CPU 901 may form the content recognition section 13, the foreground recognition section 15, and the output control section 17, for example.

The CPU 901, the ROM 902, and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904, and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

The output device 907 is formed by a device that may visually or aurally notify the user of acquired information. As such devices, there are a display device such as a CRT display device, a liquid crystal display device, a plasma display device, an EL display device, or a lamp, a sound output device such as a speaker and a headphone, a printer device, and the like. The output device 907 outputs results acquired through various processes performed by the information processing apparatus 900, for example. Specifically, the display device visually displays results acquired through various processes performed by the information processing apparatus 900 in various forms such as text, images, tables, and graphs. On the other hand, the sound output device converts audio signals including reproduced sound data, audio data, and the like into analog signals and aurally outputs the analog signals.

The storage device 908 is a device for data storage, formed as an example of a storage section of the information processing apparatus 900. For example, the storage device 908 is realized by a magnetic storage device such as an HDD, a semiconductor storage device, an optical storage device, a magneto-optical storage device, or the like. The storage device 908 may include a storage medium, a recording device for recording data on the storage medium, a reading device for reading data from the storage medium, a deletion device for deleting data recorded on the storage medium, and the like. The storage device 908 stores programs and various types of data executed by the CPU 901, various types of data acquired from the outside, and the like. The storage device 908 may form the storage section 19, for example.

The drive 909 is a reader/writer for storage media and is included in or externally attached to the information processing apparatus 900. The drive 909 reads information recorded on a removable storage medium such as a magnetic disc, an optical disc, a magneto-optical disc, or a semiconductor memory mounted thereon, and outputs the information to the RAM 903. In addition, the drive 909 may write information regarding the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark), or wireless USB (WUSB), for example. In addition, the communication device 913 may be a router for optical communication, a router for asymmetric digital subscriber line (ADSL), various communication modems, or the like. For example, the communication device 913 may transmit/receive signals and the like to/from the Internet and other communication apparatuses according to a predetermined protocol such as, for example, TCP/IP. The communication device 913 may form the interface section 11, for example.

The sensor 915 corresponds to various types of sensors such as an acceleration sensor, a gyro sensor, a geomagnetic sensor, a light sensor, a sound sensor, a distance measuring sensor, and a force sensor, for example. The sensor 915 acquires information regarding a state of the information processing apparatus 900 itself, such as an attitude and a movement speed of the information processing apparatus 900, and information regarding a surrounding environment of the information processing apparatus 900, such as brightness and noise of the periphery of the information processing apparatus 900. In addition, the sensor 915 may include a GPS sensor that receives a GPS signal, and measures latitude, longitude, and altitude of the device.

Further, the network 920 is a wired or wireless transmission path of information transmitted from devices connected to the network 920. For example, the network 920 may include a public circuit network such as the Internet, a telephone circuit network, or a satellite communication network, various local area networks (LANs) including Ethernet (registered trademark), a wide area network (WAN), and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment of the present disclosure is shown. The respective components may be implemented using universal members, or may be implemented by hardware specific to the functions of the respective components. Accordingly, according to a technical level at the time when the embodiments of the present disclosure are executed, it is possible to appropriately change hardware configurations to be used.

In addition, a computer program for realizing each of the functions of the information processing apparatus 900 according to the present embodiment of the present disclosure as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium. In addition, the above-described computer program may be distributed through, for example, a network without using a recording medium.

7. ADVANTAGEOUS EFFECTS

Advantageous effects of the present embodiment will be described again with reference to FIGS. 20 to 25. FIGS. 20 to 25 are explanatory diagrams for explaining advantageous effects of the present embodiment.

Figure 20:
FIG. 20 is an explanatory diagram for explaining advantageous effects.

As described above, according to an embodiment of the present disclosure, it is possible to create a scene in which background content displayed as the background of an aquarium and the interior of the aquarium acting as the foreground are treated as a unified space. Referring to FIG. 20, it is possible to freely change the background B300, and furthermore it is possible to create a scene in which the background B300 and the foreground F300 are treated as a unified space.

It is possible to make an image of a different place (such as the sea or a public aquarium, for example) appear in the background B300 as a space that feels like a cohesive whole. Additionally, it is also possible to make a scene that is different depending on the time of day, such as a landscape during sunrise, a sunset, rain, or snow, or a scene that changes depending on the four seasons of spring, summer, autumn, and winter appear as a scenic space that feels like a cohesive whole.

Figure 21:
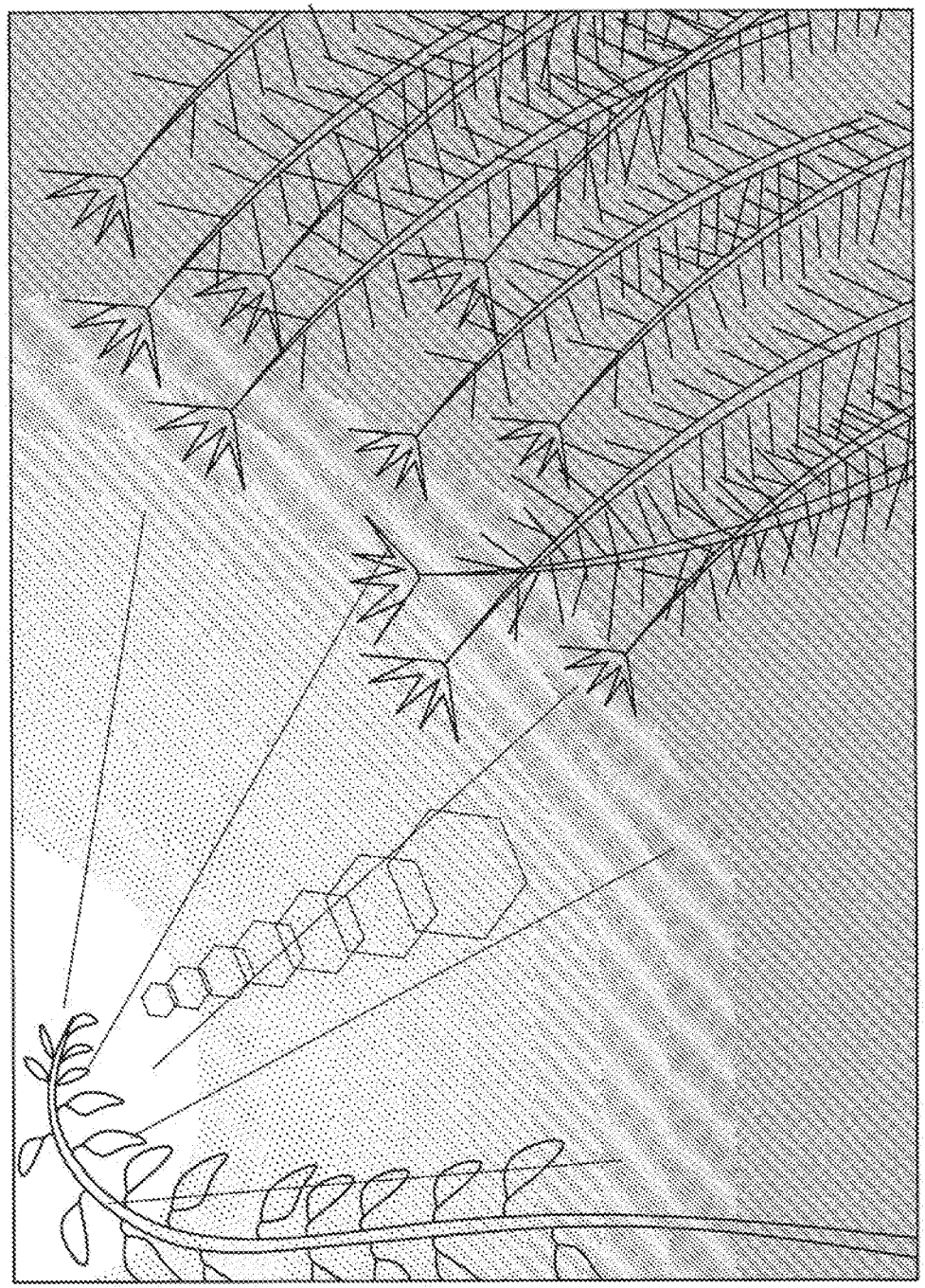
FIG. 21 is an explanatory diagram for explaining advantageous effects.
Figure 22:
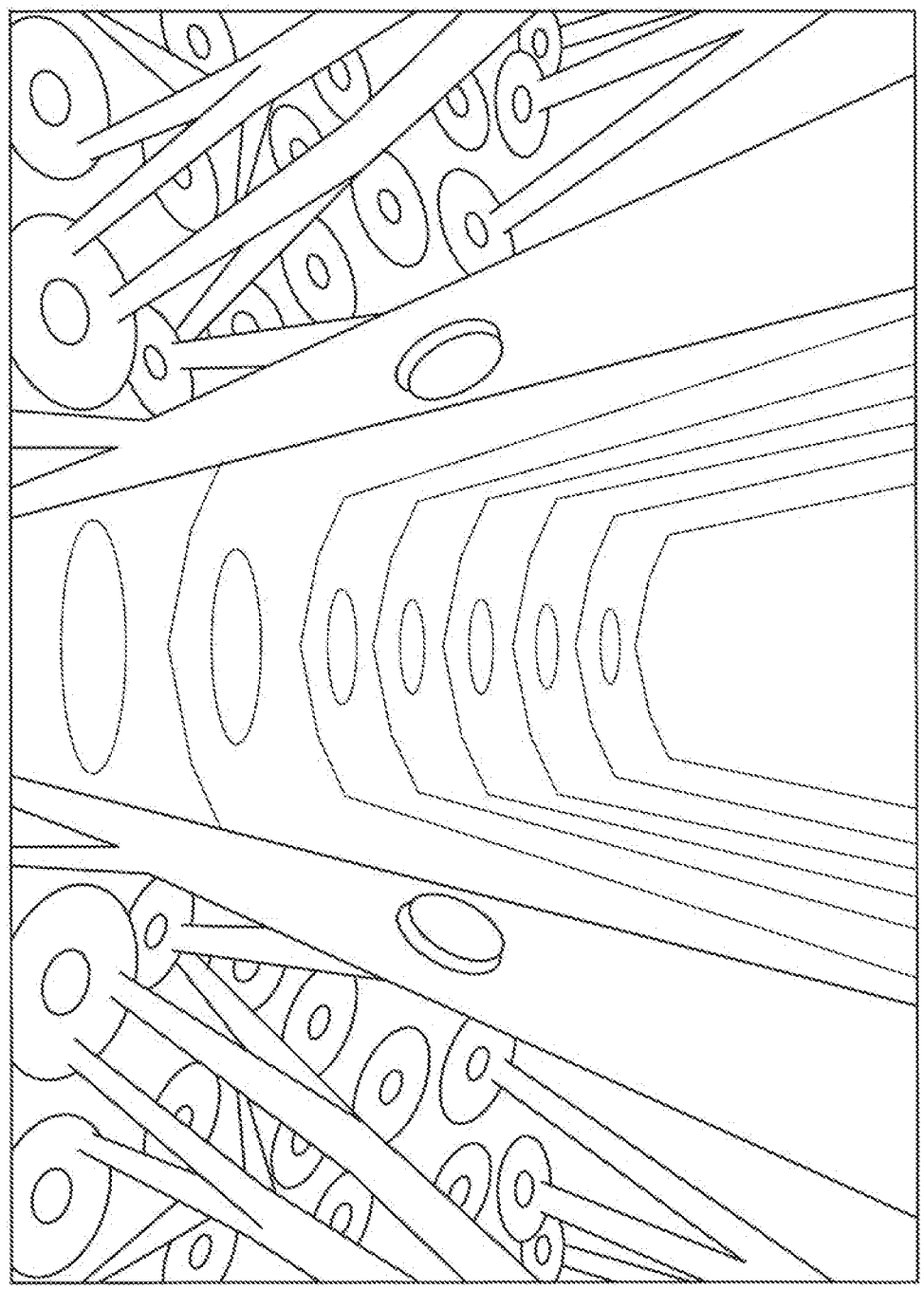
FIG. 22 is an explanatory diagram for explaining advantageous effects.
Figure 23:
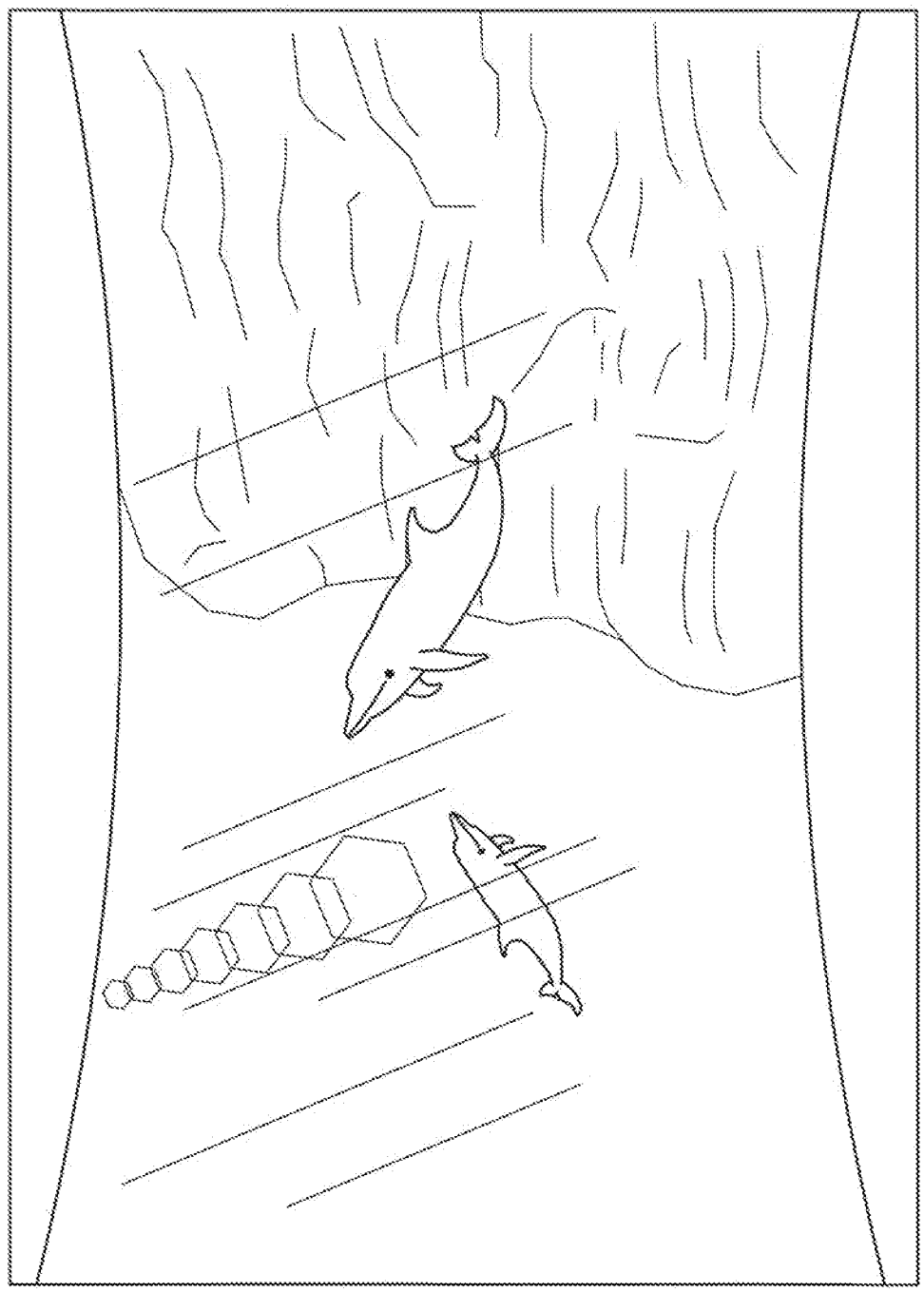
FIG. 23 is an explanatory diagram for explaining advantageous effects.
Figure 24:
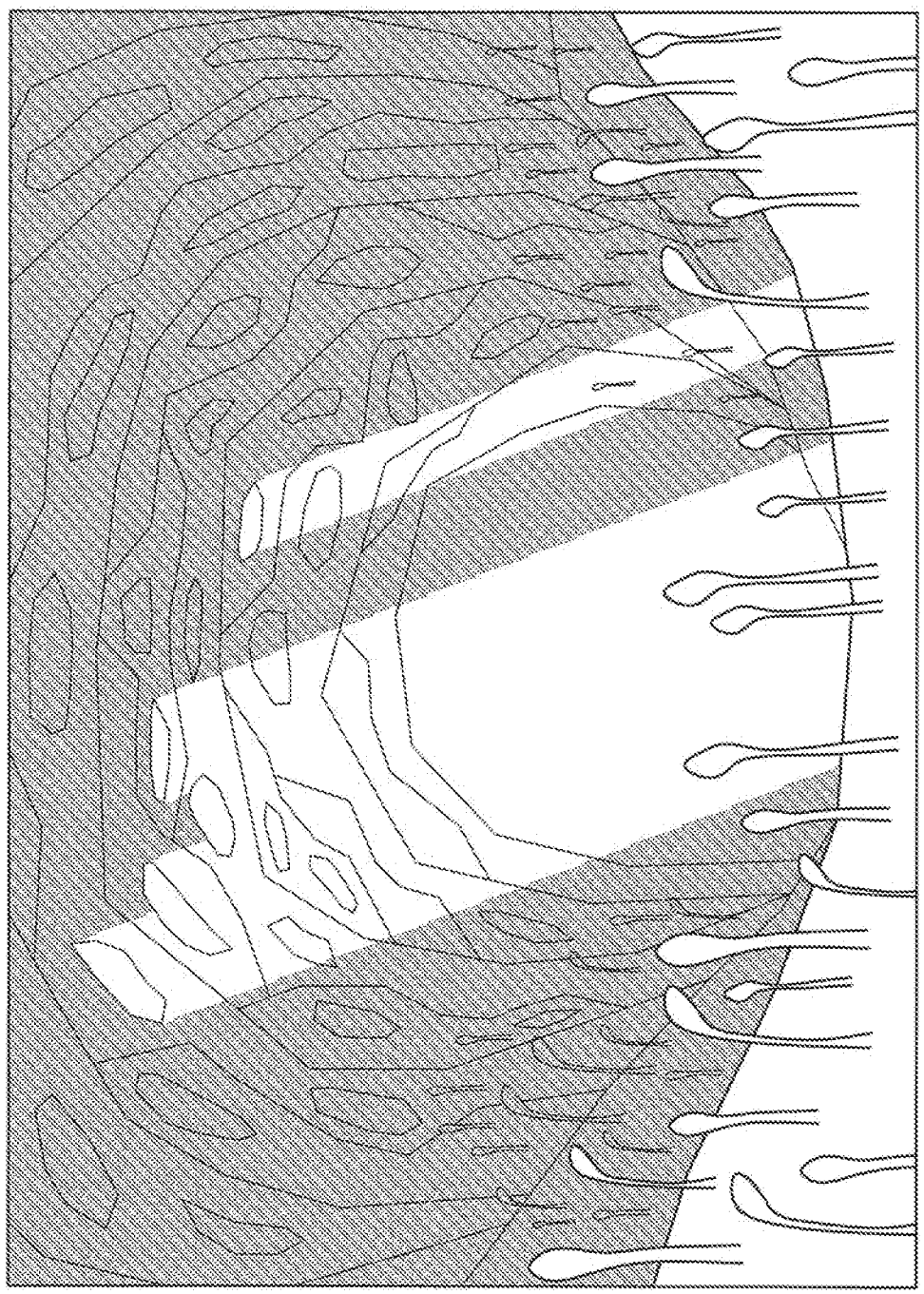
FIG. 24 is an explanatory diagram for explaining advantageous effects.
Figure 25:
FIG. 25 is an explanatory diagram for explaining advantageous effects.

Furthermore, as illustrated in FIG. 21, it is possible to create a scenic space that feels like a cohesive whole with moving background content, such as the sparkling of sunlight breaking through the surface of the water.

Additionally, it is possible to create a scene resembling a fictional scene like a shot from a movie or animation, or a scene combined with such a fictional scene, like those illustrated in FIGS. 22 to 25.

Furthermore, as described above, it is possible to create a scene that feels like a cohesive whole even with a background of a location where fish do not exist, such as in space or in the middle of a forest.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a recognition section configured to recognize background content displayed in a background of an aquarium; and an output control section configured to control an output of light into an interior of the aquarium that acts as a foreground, on the basis of a result of recognizing the background content.

(2)

The information processing apparatus according to (1), in which the recognition section recognizes color information about the background content, and the output control section controls the output of light on the basis of the color information about the background content.

(3)

The information processing apparatus according to (2), in which the output control section controls the output of light such that a color included in the background content and a color of the interior of the aquarium are similar.

(4)

The information processing apparatus according to (2) or (3), in which the color information about the background content includes information about at least one of a brightness, a hue, or a contrast.

(5)

The information processing apparatus according to any one of (1) to (4), in which the recognition section recognizes light source information about the background content, and the output control section controls the output of light on the basis of the light source information.

(6)

The information processing apparatus according to (5), in which the light source information includes information about a light source direction in the background content, and the output control section controls the output of light such that a shadow in the interior of the aquarium and the light source direction are consistent.

(7)

The information processing apparatus according to (5) or (6), in which the light source information includes information about a color of a light source in the background content, and the output control section controls the output of light such that a color of the interior of the aquarium and the color of the light source are consistent.

(8)

The information processing apparatus according to any one of (1) to (7), in which the recognition section recognizes information about a weather in the background content, and the output control section controls the output of light on the basis of the information about the weather.

(9)

The information processing apparatus according to any one of (1) to (8), in which the output control section additionally controls an output of the background content on the basis of the interior of the aquarium.

(10)

The information processing apparatus according to (9), in which the recognition section additionally recognizes the interior of the aquarium, and the output control section controls the output of the background content on the basis of a result of recognizing the interior of the aquarium.

(11)

The information processing apparatus according to (10), in which the recognition section recognizes information about an object in the interior of the aquarium, and the output control section controls the output of the background content on the basis of the information about the object.

(12)

The information processing apparatus according to (11), in which the output control section causes the background content including an object similar to the object included in the interior of the aquarium to be output on the basis of the information about the object.

(13)

The information processing apparatus according to (9), in which the recognition section recognizes illumination information about the interior of the aquarium, and the output control section controls the output of the background content on the basis of the illumination information.

(14)

The information processing apparatus according to (9), in which the output control section causes an image obtained on the basis of imaging the interior of the aquarium to be output as the background content.

(15)

The information processing apparatus according to any one of (1) to (14), in which
the output control section controls the output of light by an illumination apparatus.

(16)

The information processing apparatus according to any one of (1) to (15), in which
the output control section controls the output of light by a projector.

(17)

The information processing apparatus according to any one of (1) to (16), in which
the output control section controls the output of light to thereby cause a virtual object to be displayed in the interior of the aquarium.

(18)

An information processing method including:
recognizing background content displayed in a background of an aquarium; and
controlling an output of light into an interior of the aquarium that acts as a foreground, on the basis of a result of recognizing the background content.

(19)

A program causing a computer to execute functions of:
recognizing background content displayed in a background of an aquarium; and
controlling an output of light into an interior of the aquarium that acts as a foreground, on the basis of a result of recognizing the background content.

REFERENCE SIGNS LIST 1 aquarium system
10 control section
11 interface section
13 content recognition section
15 foreground recognition section
17 output control section
19 storage section
20 aquarium
30 light output section
40 camera section
50 display section
60 optical viewing distance generation section
70 communication section
80 speaker

The invention claimed is:

1. An information processing apparatus comprising:
a recognition section configured to recognize background content displayed in a background of an aquarium; and
an output control section configured to:
control an output of light into an interior of the aquarium that acts as a foreground, based on a result of recognition of the background content; and
control an output of the background content based on the interior of the aquarium.

2. The information processing apparatus according to claim 1, wherein,
the recognition section is further configured to recognize color information about the background content, and
the output control section is configured to control the output of light further based on the color information about the background content.

3. The information processing apparatus according to claim 2, wherein
the output control section is further configured to control the output of light such that a color included in the background content and a color of the interior of the aquarium are similar.

4. The information processing apparatus according to claim 2, wherein
the color information about the background content includes information about at least one of a brightness, a hue, or a contrast of the background content.

5. The information processing apparatus according to claim 1, wherein
the recognition section is further configured to recognize light source information about the background content, and
the output control section is configured to control the output of light further based on the light source information.

6. The information processing apparatus according to claim 5, wherein
the light source information includes information about a light source direction in the background content, and
the output control section is configured to control the output of light such that a shadow in the interior of the aquarium and the light source direction are consistent.

7. The information processing apparatus according to claim 5, wherein
the light source information includes information about a color of a light source in the background content, and
the output control section is configured to control the output of light such that a color of the interior of the aquarium and the color of the light source are consistent.

8. The information processing apparatus according to claim 1, wherein
the recognition section is further configured to recognize information about a weather in the background content, and
the output control section is configured to control the output of light further based on the information about the weather.

9. The information processing apparatus according to claim 1, wherein
the recognition section is further configured to recognize the interior of the aquarium, and
the output control section is configured to control the output of the background content further based on a result of recognition of the interior of the aquarium.

10. The information processing apparatus according to claim 1, wherein
the recognition section is further configured to recognize information about a first object in the interior of the aquarium, and
the output control section is configured to control the output of the background content further based on the information about the first object.

11. The information processing apparatus according to claim 10, wherein
the output control section is further configured to cause the background content, that includes a second object similar to the first object, to be output based on the information about the first object.

12. The information processing apparatus according to claim 1, wherein the recognition section is further configured to recognize illumination information about the interior of the aquarium, and the output control section is configured to control the output of the background content further based on the illumination information.

13. The information processing apparatus according to claim 1, wherein the output control section is further configured to cause an image, obtained based on imaging of the interior of the aquarium, to be output as the background content.

14. The information processing apparatus according to claim 1, wherein the output control section is further configured to control the output of light by an illumination apparatus.

15. The information processing apparatus according to claim 1, wherein the output control section is further configured to control the output of light by a projector.

16. The information processing apparatus according to claim 1, wherein the output control section is further configured to control the output of light to display a virtual object in the interior of the aquarium.

17. An information processing method comprising:

recognizing background content displayed in a background of an aquarium;

controlling an output of light into an interior of the aquarium that acts as a foreground, based on a result of recognition of the background content; and controlling an output of the background content based on the interior of the aquarium.

18. A non-transitory computer-readable medium having stored thereon, computer-executable instructions which, when executed by a processor, cause the processor to execute operations, the operations comprising:

recognizing background content displayed in a background of an aquarium; and controlling an output of light into an interior of the aquarium that acts as a foreground, based on a result of recognition of the background content; and controlling an output of the background content based on the interior of the aquarium.

* * * * *